(12) United States Patent (10) Patent No.: US 8,941,622 B2
Kobayashi et al. (45) Date of Patent: Jan. 27, 2015

(54) COORDINATE INPUT APPARATUS

(71) Applicant: Canon Kabushiki Kaisha, Tokyo (JP)

(72) Inventors: Katsuyuki Kobayashi, Yokohama (JP); Hirokuni Takano, Yoshikawa (JP); Yuichiro Yoshimura, Yokohama (JP); Hajime Sato, Yokohama (JP); Ritsuo Machii, Tokyo (JP); Takuto Kawahara, Tokyo (JP); Takayuki Hashimoto, Yokohama (JP); Takayuki Komine, Kawasaki (JP); Akihiro Matsushita, Tokyo (JP); Naoki Umemura, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1 day.

(21) Appl. No.: 13/828,270

(22) Filed: Mar. 14, 2013

(65) Prior Publication Data

US 2013/0257814 A1 Oct. 3, 2013

(30) Foreign Application Priority Data

Mar. 30, 2012 (JP) ................................. 2012-082091

(51) Int. Cl.
*G06F 3/042* (2006.01)
(52) U.S. Cl.
CPC ............ *G06F 3/0421* (2013.01); *G06F 3/0428* (2013.01)
USPC ........................................................ 345/175
(58) Field of Classification Search
None
See application file for complete search history.

(56) References Cited

U.S. PATENT DOCUMENTS

| | | | |
|---|---|---|---|
| 4,507,557 | A | 3/1985 | Tsikos |
| 4,613,964 | A | 9/1986 | Ichikawa et al. |
| 4,886,943 | A | 12/1989 | Suzuki et al. |
| 4,887,245 | A | 12/1989 | Mori et al. |
| 4,910,363 | A | 3/1990 | Kobayashi et al. |
| 4,931,965 | A | 6/1990 | Kaneko et al. |
| 4,980,518 | A | 12/1990 | Kobayashi et al. |
| 5,070,325 | A | 12/1991 | Tanaka et al. |
| 5,097,102 | A | 3/1992 | Yoshimura et al. |

(Continued)

FOREIGN PATENT DOCUMENTS

| | | |
|---|---|---|
| JP | 2001-43021 A | 2/2001 |
| JP | 2004-272353 A | 9/2004 |
| JP | 4118664 A | 7/2008 |

OTHER PUBLICATIONS

U.S. Appl. No. 13/781,644, filed Feb. 28, 2013. Applicant: Masahiro Suzuki, et al.

(Continued)

*Primary Examiner* — Adam R Giesy
(74) *Attorney, Agent, or Firm* — Fitzpatrick, Cella, Harper & Scinto

(57) ABSTRACT

A coordinate input apparatus includes a first housing and a second housing each of which incorporate at least two sensor units each including one of the light projecting unit and one of the light receiving unit. A pointed position to an effective coordinate input region is calculated based on variations of a light amount distribution obtained from the light receiving units of each of the first and second housings. In each of the first and second housings, the field range of a light receiving unit is almost parallel to the effective coordinate input region, the optical axis direction of the light receiving unit is a direction perpendicular to a line segment connecting the barycenters of at least two sensor units in a single housing, and the field range is set to be asymmetric to the optical axis direction.

8 Claims, 15 Drawing Sheets

(56) References Cited

U.S. PATENT DOCUMENTS

| | | |
|---|---|---|
| 5,097,415 A | 3/1992 | Yoshimura et al. |
| 5,142,106 A | 8/1992 | Yoshimura et al. |
| 5,210,785 A | 5/1993 | Sato et al. |
| 5,231,394 A | 7/1993 | Sato |
| 5,239,138 A | 8/1993 | Kobayashi et al. |
| 5,500,492 A | 3/1996 | Kobayashi et al. |
| 5,517,553 A | 5/1996 | Sato et al. |
| 5,539,678 A | 7/1996 | Tanaka et al. |
| 5,565,893 A | 10/1996 | Sato et al. |
| 5,621,300 A | 4/1997 | Sato et al. |
| 5,714,698 A | 2/1998 | Tokioka et al. |
| 5,724,647 A | 3/1998 | Sato |
| 5,726,686 A | 3/1998 | Taniishi et al. |
| 5,736,979 A | 4/1998 | Kobayashi et al. |
| 5,751,133 A | 5/1998 | Sato et al. |
| 5,805,147 A | 9/1998 | Tokioka et al. |
| 5,818,429 A | 10/1998 | Tanaka et al. |
| 5,831,603 A | 11/1998 | Yoshimura et al. |
| 5,852,466 A | 12/1998 | Komine et al. |
| 5,936,207 A | 8/1999 | Kobayashi et al. |
| 6,415,240 B1 | 7/2002 | Kobayashi et al. |
| 6,636,199 B2 | 10/2003 | Kobayashi |
| 6,862,019 B2 | 3/2005 | Kobayashi et al. |
| 6,965,377 B2 | 11/2005 | Yanagisawa et al. |
| 7,075,524 B2 | 7/2006 | Kobayashi et al. |
| 7,486,281 B2 | 2/2009 | Kobayashi et al. |
| 7,538,894 B2 | 5/2009 | Kobayashi |
| 7,589,715 B2 | 9/2009 | Tanaka et al. |
| 7,965,904 B2 | 6/2011 | Kobayashi |
| 8,107,641 B2 | 1/2012 | Sakata et al. |
| 2005/0133692 A1 | 6/2005 | Watanabe et al. |
| 2008/0211904 A1 | 9/2008 | Kato et al. |
| 2011/0141486 A1* | 6/2011 | Wada et al. .................. 356/614 |
| 2011/0148758 A1 | 6/2011 | Hashimoto |
| 2011/0164114 A1 | 7/2011 | Kobayashi et al. |
| 2011/0304535 A1 | 12/2011 | Machii |
| 2012/0002217 A1 | 1/2012 | Kobayashi et al. |
| 2012/0065929 A1 | 3/2012 | Yoshimura |
| 2013/0076624 A1 | 3/2013 | Sato |
| 2013/0135902 A1 | 5/2013 | Umemura |

OTHER PUBLICATIONS

U.S. Appl. No. 13/775,626, filed Feb. 25, 2013. Applicant: Hirokuni Takano, et al.

U.S. Appl. No. 13/673,913, filed Nov. 9, 2012. Applicant: Naoki Umemura.

* cited by examiner

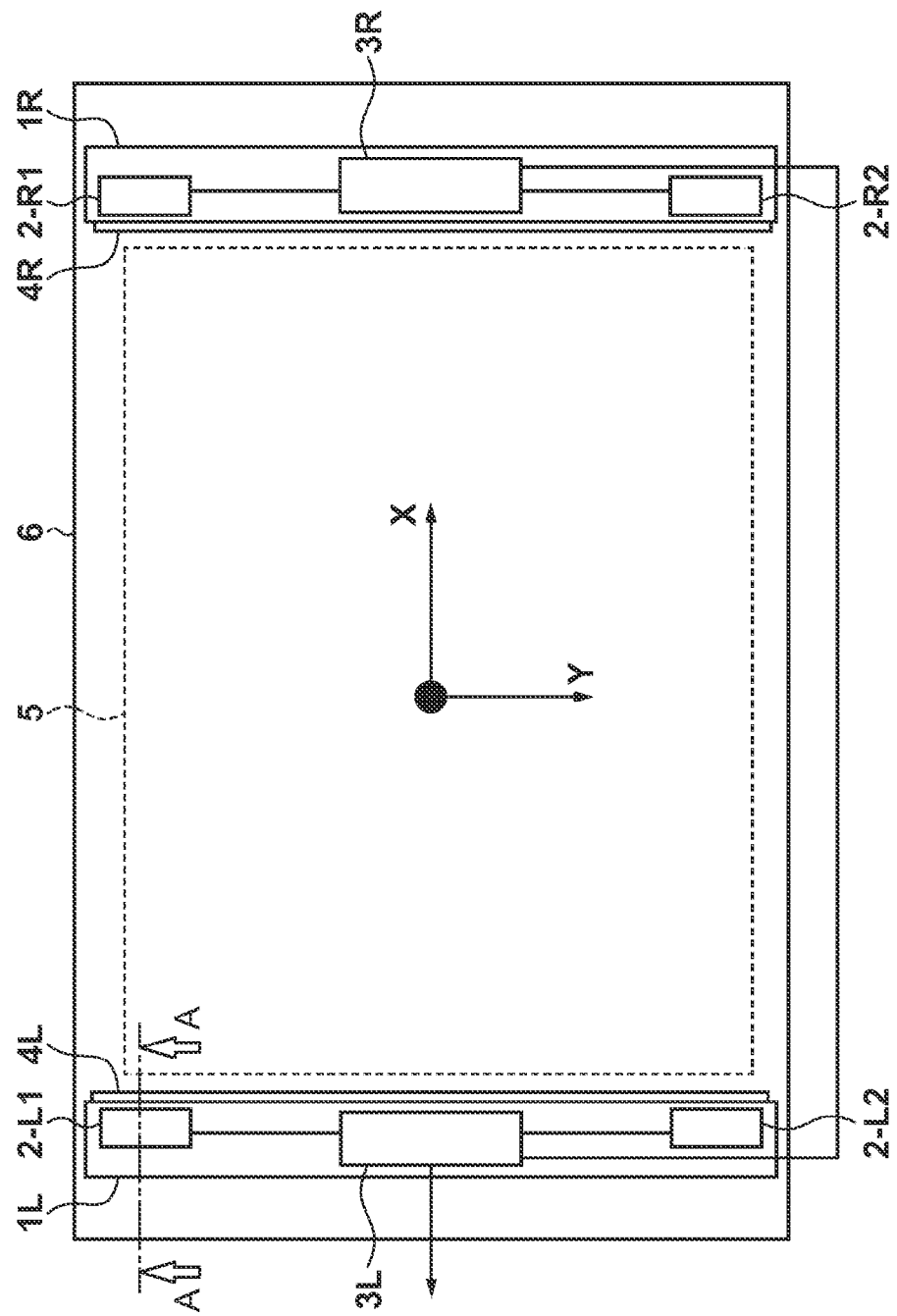

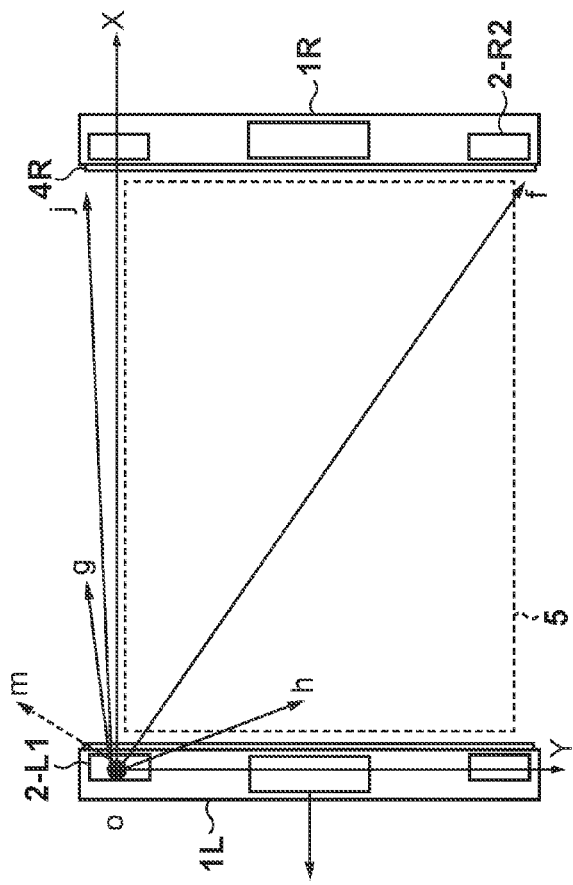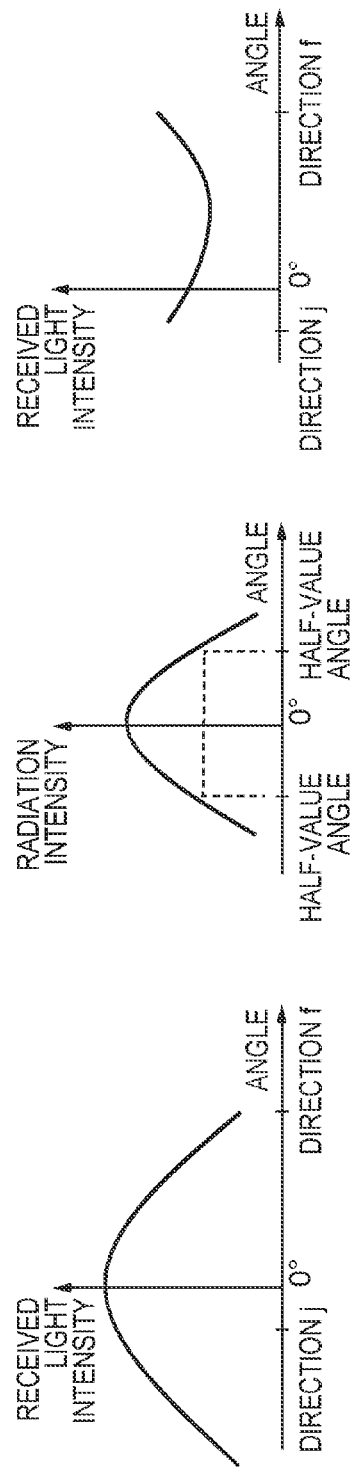
FIG. 3A
FIG. 3B
FIG. 3C
FIG. 3D

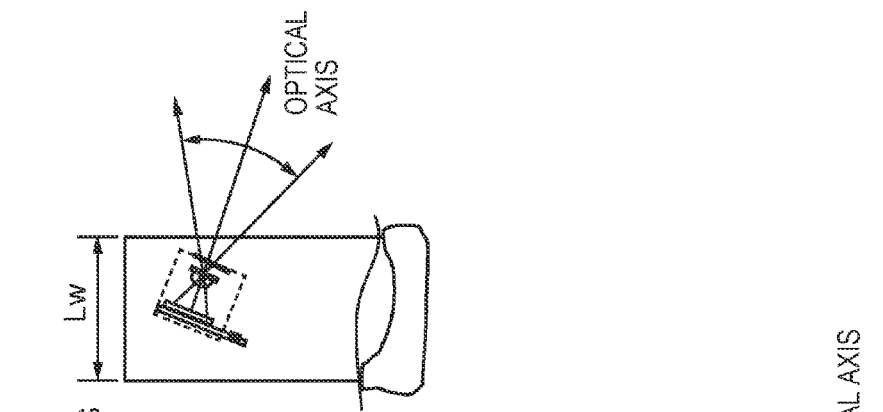
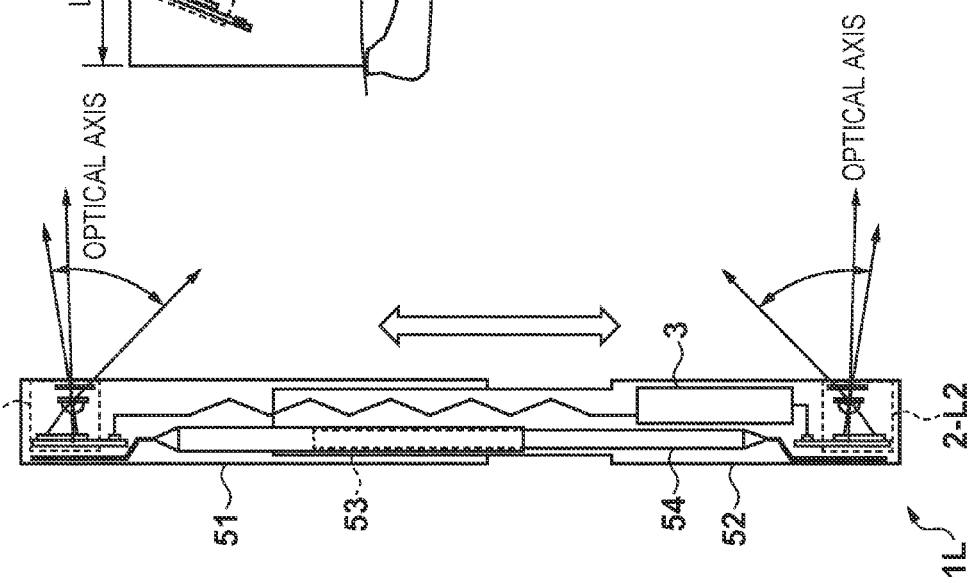
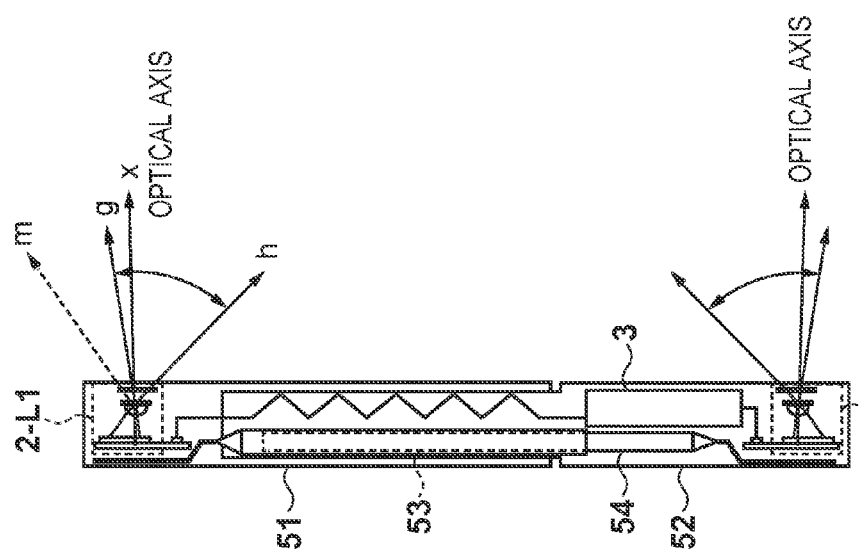

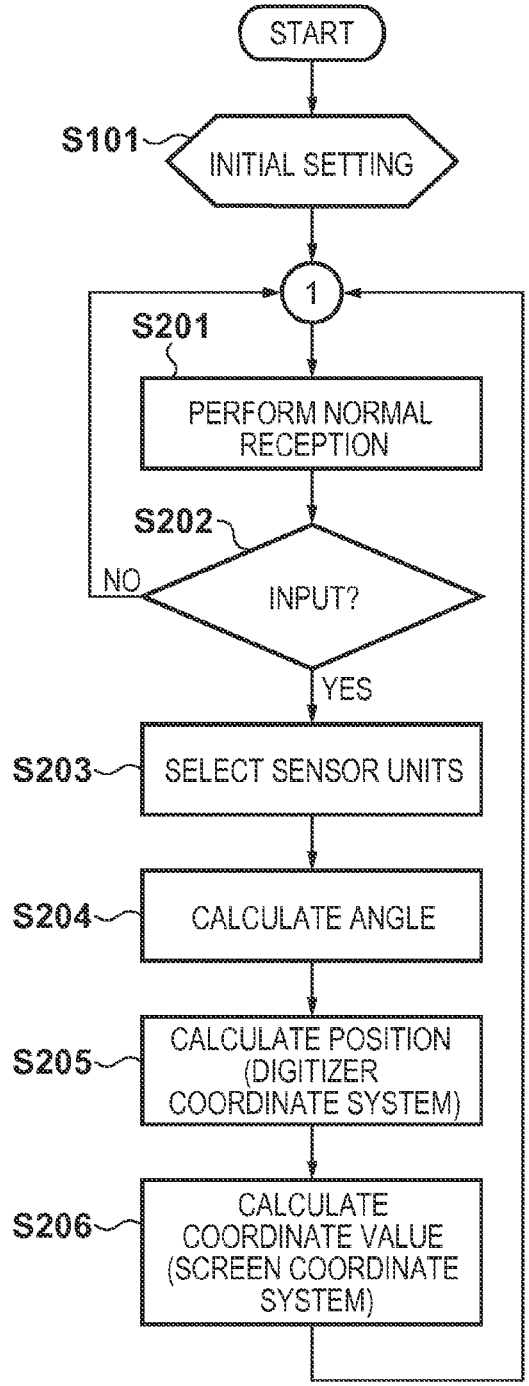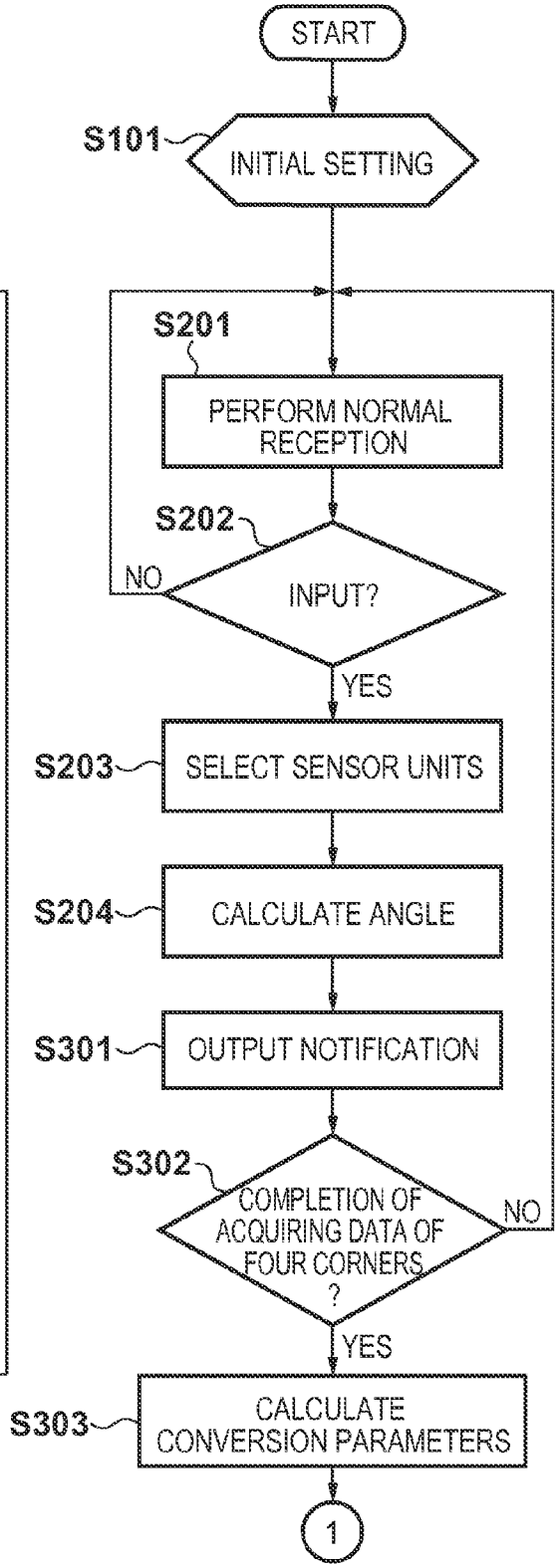

COORDINATE INPUT APPARATUS

BACKGROUND OF THE INVENTION

1. Field of the Invention

The present invention relates to a coordinate input apparatus which optically detects a coordinate position input to a coordinate input surface by a pointer such as a finger in order to input or select information. Particularly, the present invention relates to a detachable portable coordinate input apparatus.

2. Description of the Related Art

As such coordinate input apparatuses, various types of coordinate input apparatuses (touch panels and digitizers) have conventionally been proposed and commercialized. For example, a touch panel capable of easily operating a terminal such as a PC (Personal Computer) by touching the screen with a finger without using a special tool or the like is widely used.

Coordinate input methods range from a method using a resistive film to a method using an ultrasonic wave. As a method using light, there is known a method (light shielding method) of arranging a retroreflecting member outside a coordinate input surface, reflecting light from a light projecting unit by the retroreflecting member, and detecting the light amount distribution by a light receiving unit (see, for example, U.S. Pat. No. 4,507,557 and Japanese Patent Laid-Open No. 2004-272353). This method detects the direction of a light shielding portion (region) where light is cut off with a finger or the like in the coordinate input region, and determines the coordinates of the light shielding position, that is, coordinate input position.

FIG. 13 shows an arrangement as an example of generalizing the arrangement disclosed in the specification of U.S. Pat. No. 4,507,557. FIG. 13 shows sensor units 2L and 2R which are arranged at two ends of a coordinate input surface, and an effective coordinate input region 5 serving as a coordinate input surface used to input coordinates. A retroreflecting member 4 is arranged on three sides around the effective coordinate input region 5 to retroreflect incident light in the incident direction.

Each of the sensor units 2L and 2R includes a light projecting unit and light receiving unit (not shown). The light projecting unit projects light, which spreads in a fan-like shape almost parallelly to the input surface of the effective coordinate input region 5. The retroreflecting member 4 retroreflects the light, and the light receiving unit receives the return light. The coordinate input apparatus can calculate a touch position P input to the effective coordinate input region 5 based on the light shielding directions (light shielding angles θL and θR) of beams detected by the two sensor units 2L and 2R, and the distance between these sensor units.

As shown in FIG. 13, the field ranges of the sensor units 2L and 2R are symmetrically set by using the optical axis directions of the sensor units 2L and 2R as symmetry lines. In a coordinate input apparatus of this type using the lens optical system, if an angle formed with the optical axis increases, the optical performance always degrades under the influence of aberration. Employing a centered optical system can implement a higher-performance apparatus.

In FIG. 13, an arithmetic control circuit 3 controls the sensor units 2L and 2R, processes acquired output signals from the sensor units 2L and 2R, and outputs the processing result to an external apparatus.

Japanese Patent Laid-Open No. 2004-272353 exemplifies the detailed arrangements of the light projecting unit and light receiving unit of the sensor unit in the light shielding coordinate input apparatus disclosed in the specification of U.S. Pat. No. 4,507,557.

Further, Japanese Patent Laid-Open No. 2001-43021 discloses an arrangement which controls lighting of light projecting units in respective sensor units. More specifically, in Japanese Patent Laid-Open No. 2001-43021, it is controlled to alternately emit light from the light projecting units of the sensor units in order to prevent reception of light emitted by the light projecting unit of one sensor unit as disturbance light by the light receiving unit of the other sensor unit.

Further, Japanese Patent No. 4118664 discloses an arrangement in which a plurality of sensor units are arranged on two facing sides of an effective coordinate input region, and form a gap between a retroreflecting member and a coordinate input surface.

Integrating a coordinate input apparatus of this type with a display apparatus makes it possible to control the display state by touching the display screen of the display apparatus, or display the locus of a touch position as handwriting as in the relationship between paper and a pencil.

As the display apparatus, flat panel displays and front projectors of various types such as a liquid crystal display are known. For the flat panel display, the above-mentioned operational environment can be implemented by superimposing a coordinate input apparatus on it. A mobile device such as a smartphone is a typical example of this. Along with upsizing of flat panel displays, it is becoming popular to combine the flat panel display with a large-size touch panel and introduce it into, for example, the digital signage field.

For the front projector capable of a large-size display, a position detection unit is assembled into a screen board or the like serving as its projection surface, and an image is projected onto the screen board. The size of the coordinate input apparatus depends on that of the screen board serving as a touch operation surface, and the apparatus becomes relatively large. In general, therefore, a stand for moving the screen board is attached to the screen board, or the screen board is fixed to the wall and used. A larger-size front projector exponentially raises the sales price, seriously inhibiting the spread of a large-size coordinate input apparatus and an application using it.

In the light shielding coordinate input apparatus shown in FIG. 13, the sensor units 2, arithmetic control circuit 3, and retroreflecting member 4 are main components and attached to the screen board. Even if the apparatus becomes large, the arrangement of the main components remains unchanged, and the cost of the material of the screen board occupies most part of the cost rise caused by upsizing.

A user interface operated by touching the display screen of a display apparatus is intuitive and usable by everyone and has gone mainstream in mobile devices now. Such an operation is requested of even an apparatus having a larger display screen.

Detailed applications of a large screen are mainly requested from markets such as ICT education in the classroom and digital signage as a presentation function at a meeting and a whiteboard function. To meet this demand, the introduction cost for implementing the operational environment needs to be greatly reduced.

In most current meeting rooms and classrooms, whiteboards and front projectors have already been introduced as equipment. The present invention has as its object to provide an operational environment capable of a touch operation at low cost even for a large screen by effectively using such apparatuses already purchased by the user.

As described above, the main building components of the light shielding coordinate input apparatus are at least two sensor units 2 which detect directions in which the optical path is cut off by a touch operation, the arithmetic control circuit 3, and the retroreflecting member 4. If these main building components can be attached to, for example, a whiteboard at predetermined positions and sizes, a touch position on the whiteboard can be detected. Using an existing whiteboard as the screen board can omit, from indispensable building components, the screen board itself which occupies most of the cost. This can greatly suppress the product price and provide a touch operation environment at low cost even for a large screen.

The position detection principle of the light shielding coordinate input apparatus geometrically calculates a touch position based on light shielding directions (=angles) of the touch position output from at least two sensor units, and distance information between these sensor units. To detect a touch position at high accuracy, the sensor units need to be positioned and attached at high accuracy. It can be that the user can easily attach these sensor units.

In contrast, even rough positioning and attachment of the sensor units by the user can implement the following usage if high-accuracy touch position detection is possible. More specifically, only the main building components of the light shielding coordinate input apparatus are carried, and used by easily attaching them within a short time to a whiteboard installed in a meeting room where a meeting is held. After the end of the meeting, the main building components are detached and carried back, or carried to another meeting room and used there. In short, a detachable portable coordinate input apparatus can be operated by "everybody" "at any time" "anywhere" "easily". The number of building components of a product itself for implementing this can be small. Further, the product is compact and lightweight for portability.

Since the main building components can be attached and detached, they can be attached to, for example, an already purchased whiteboard by using magnets. Using the whiteboard as the projection surface can provide an input/output integrated touch operation environment. In general, whiteboards of various sizes are commercially available. By using a larger-size whiteboard, an image can be projected onto a larger display surface, needless to say. It can be that the main building components can be set in accordance with various sizes of whiteboards installed in meeting rooms and can detect a touch position at high accuracy.

The present invention provides a coordinate input apparatus in which an existing whiteboard or the wall surface of a meeting room or the like is used as a projection surface and the display surface can be controlled by touching the projection surface.

SUMMARY OF THE INVENTION

To achieve the above object, a coordinate input apparatus according to the present invention has the following arrangement.

More specifically, a coordinate input apparatus which detects a pointed position to an effective coordinate input region, comprises: a light projecting unit configured to project light parallelly to the effective coordinate input region; a reflection unit configured to retroreflect the light projected by the light projecting unit; a light receiving unit configured to receive light from one of the light projecting unit and the reflection unit; a first housing configured to incorporate at least two sensor units each including one of the light projecting unit and one of the light receiving unit; a second housing configured to incorporate at least two sensor units each including one of the light projecting unit and one of the light receiving unit; and a calculation unit configured to calculate the pointed position to the effective coordinate input region based on a variation of a light amount distribution obtained from the light receiving units of each of the first housing and the second housing, wherein in each of the first housing and the second housing, a field range of the light receiving unit is substantially parallel to the effective coordinate input region, an optical axis direction of the light receiving unit is a direction perpendicular to a line segment connecting barycenters of the at least two sensor units in a single housing, and the field range is set to be asymmetric to the optical axis direction.

The present invention having the above-described arrangement can provide a coordinate input apparatus in which an existing whiteboard or the wall surface of a meeting room or the like is used as a projection surface and the display surface can be controlled by touching the projection surface.

Further features of the present invention will become apparent from the following description of exemplary embodiments (with reference to the attached drawings).

BRIEF DESCRIPTION OF THE DRAWINGS

FIG. 1 is a view showing the schematic arrangement of the coordinate input apparatus according to the embodiment;

FIG. 3A is a view for explaining the field ranges of a light projecting unit and light receiving unit according to the embodiment;

FIG. 3B is a graph for explaining the field ranges of the light projecting unit and light receiving unit according to the embodiment;

FIG. 3C is a graph for explaining the field ranges of the light projecting unit and light receiving unit according to the embodiment;

FIG. 3D is a graph for explaining the field ranges of the light projecting unit and light receiving unit according to the embodiment;

FIG. 4A is a view showing the schematic arrangement of the sensor bar according to the embodiment;

FIG. 4B is a view showing the schematic arrangement of the sensor bar according to the embodiment;

FIG. 4C is a view showing the schematic arrangement of the sensor bar according to the embodiment;

FIG. 12A is a flowchart showing a normal operation and calibration processing according to the embodiment;

FIG. 12B is a flowchart showing a normal operation and calibration processing according to the embodiment.

DESCRIPTION OF THE EMBODIMENTS

Figure 2A:
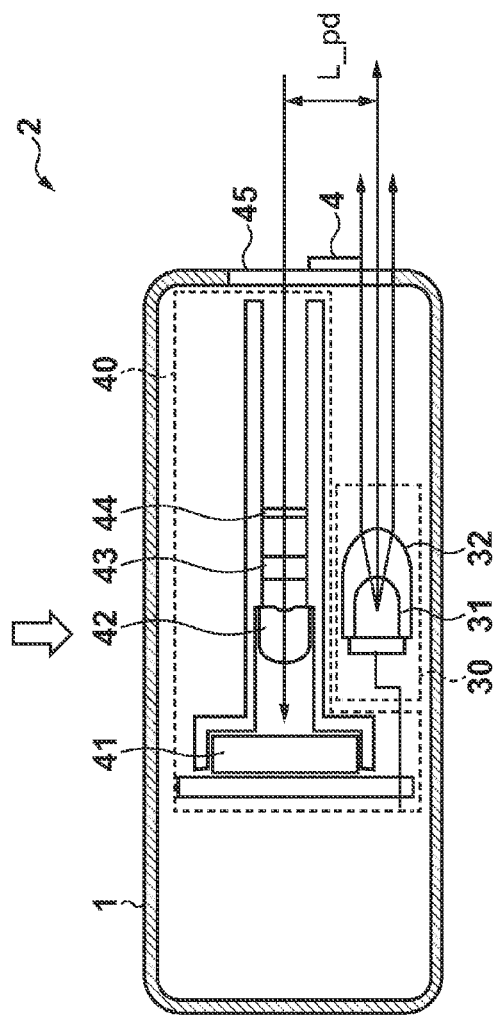
FIG. 2A is a view showing the detailed arrangement of a sensor unit according to the embodiment.

Embodiments of the present invention will now be described in detail with reference to the accompanying drawings. Note that arrangements set forth in the following embodiments are merely examples, and the present invention is not limited to illustrated arrangements.

The schematic arrangement of a coordinate input apparatus according to the present invention will be explained with reference to FIG. 1.

In FIG. 1, sensor bars 1L and 1R are housings each including at least two sensor units 2-L1 and 2-L2 or 2-R1 and 2-R2.

As shown in FIG. 1, the sensor bars 1L and 1R (to be generically referred to as sensor bars 1) are arranged on two facing sides of a rectangular effective coordinate input region 5. If the display apparatus is a front projector, the display region is set within the range of the effective coordinate input region 5 and projected onto, for example, the flat whiteboard 6. As a matter of course, the projection surface is not limited to the whiteboard 6 and may be a wall surface or the like.

As shown in FIG. 1, retroreflecting members 4L and 4R (to be generically referred to as retroreflecting members 4) are mounted on the side surfaces of the sensor bars 1L and 1R, respectively. The retroreflecting members 4L and 4R are configured to retroreflect infrared light projected from the sensor units of the sensor bars 1R and 1L arranged on facing sides.

The sensor bar 1L incorporates sensor units 2-L1 and 2-L2, and the sensor bar 1R incorporates sensor units 2-R1 and 2-R2. An arithmetic control circuit 3L incorporated in the sensor bar 1L controls the sensor units 2-L1 and 2-L2, performs arithmetic processing for the output results, and controls an arithmetic control circuit 3R of the sensor bar 1R. The arithmetic control circuit 3R of the sensor bar 1R controls the sensor units 2-R1 and 2-R2, performs arithmetic processing for the output results, and transmits the results to the arithmetic control circuit 3L of the sensor bar 1L. The arithmetic control circuit 3L of the sensor bar 1L processes output results from the four sensor units 2-L1, 2-L2, 2-R1, and 2-R2, calculates a touch position, and outputs the results to an external device such as a personal computer.

In FIG. 1, the arithmetic control circuit 3L of the sensor bar 1L and the arithmetic control circuit 3R of the sensor bar 1R are connected by a cord (that is, wired connection), but the present invention is not limited to this. For example, the arithmetic control circuits 3L and 3R may have a wireless communication function and transmit/receive data using the communication functions (wireless connection).

In the following description, the horizontal direction is the X-axis (positive (+) on the right side in the drawing), and the vertical direction is the Y-axis (positive (+) on the down side).

Figure 2C:
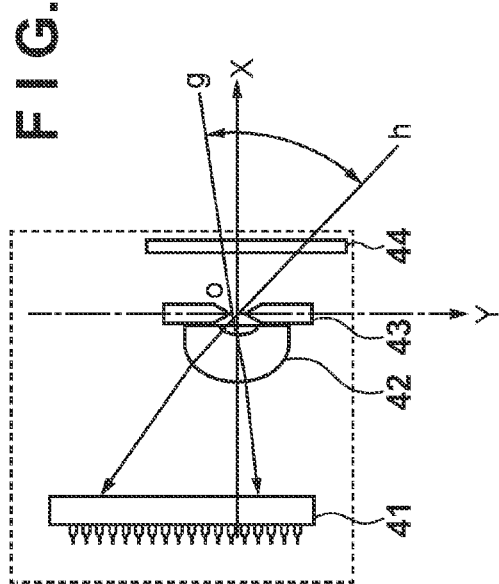
FIG. 2C is a view showing the detailed arrangement of the sensor unit according to the embodiment.
Figure 2B:
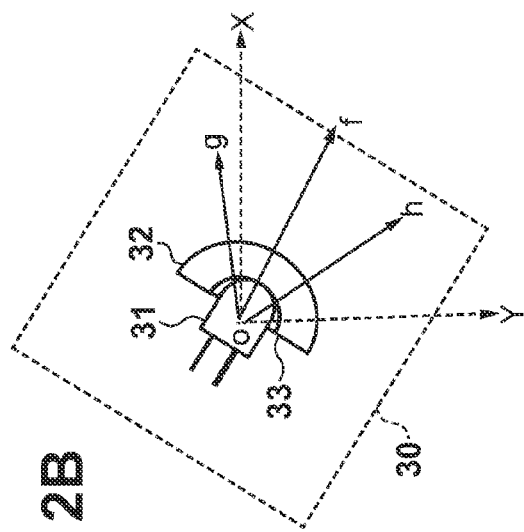
FIG. 2B is a view showing the detailed arrangement of the sensor unit according to the embodiment.

FIGS. 2A to 2C are views showing the detailed arrangement of the sensor units 2-L1, 2-L2, 2-R1, and 2-R2 (to be generically referred to as sensor units 2). FIG. 2A is a sectional view taken along a line A-A in FIG. 1, and FIGS. 2B and 2C are front views when viewed from a direction indicated by an arrow in FIG. 2A.

In FIG. 2A, the sensor unit 2 is stored in the sensor bar 1 and formed from the light projecting unit 30 and light receiving unit 40. The distance between the light projecting unit 30 and the light receiving unit 40 is L_pd, and the retroreflecting member 4 is interposed between them as shown in FIG. 2A. A light transparent member 45 is a protection member for preventing entrance of a foreign substance such as dust into the sensor bar 1.

In FIG. 2B, the light projecting unit 30 includes an infrared LED 31 serving as a light emitting unit, a projection lens 32, and an adhesion layer 33 for fixing them. The projection lens 32 is configured to change light from the infrared LED 31 into a beam almost parallel to the whiteboard 6 serving as the coordinate input surface. The light projecting unit 30 emits a fan-like beam having a vertex at the position of a point O (the barycentric position of the sensor unit 2) in a light projecting range of g to h so as to illuminate the entire region of the retroreflecting member 4 of the sensor bar 1 arranged on a facing side. At this time, the optical axis of the light projecting unit 30 is set in the direction f, the reason of which will be described later.

In FIG. 2C, the light receiving unit 40 detects light which has been projected by the light projecting unit 30 and retroreflected by the retroreflecting member 4 mounted in the sensor bar 1 arranged on a facing side. Reference numeral 41 denotes a line CCD serving as a photoelectric converter; 42, a light receiving lens; 43, a field stop; and 44, an infrared pass filter. The infrared pass filter 44 may be omitted by giving the infrared pass filter function may be given to a protection member 45.

The optical axis of the light receiving unit 40 is set in the X-axis direction. The field range is a range of g to h, and the position of the point O serves as an optical center position. As shown in FIG. 2C, the light receiving unit 40 is an optical system asymmetric to the optical axis. The light projecting unit 30 and light receiving unit 40 are arranged to overlap each other, as shown in FIG. 2A, so that the positions of the points O, the directions g, and the directions h substantially coincide with each other. Since the light receiving unit 40 condenses light to a pixel of the line CCD 41 in accordance with the direction of incident light, the pixel number of the line CCD 41 represents angle information of incident light.

The light receiving unit 40 has a field range almost parallel to the coordinate input surface of the effective coordinate input region 5, and its optical axis direction is arranged to coincide with the direction of normal to the light receiving surface of the line CCD 41.

FIG. 3A is a view showing the schematic arrangement of the coordinate input apparatus and the arrangement of the optical system of the light projecting unit 30 and light receiving unit 40. The range in which the light projecting unit 30 of the sensor bar 1L projects light toward the retroreflecting member 4R mounted on the sensor bar 1R arranged on a facing side is a range of g to h. Light in a direction in a range of j to f in which the retroreflecting member 4R is actually mounted is retroreflected and detected by the light receiving unit 40.

Beams of light projected by the light projecting unit 30 schematically shown in FIG. 2A do not become completely parallel, and as the light projecting distance increases, the beam width increases. Hence, the amount of light retroreflected by the retroreflecting member 4R decreases as the distance to the retroreflecting member 4R increases. Thus, the retroreflection efficiency becomes poor in the direction f in which the distance from the light projecting point O to the retroreflecting member 4R is long, compared to the direction j in which the distance is short.

Further, the retroreflection efficiency of the retroreflecting member 4R decreases as the incident angle increases, compared to a case in which light hits the retroreflecting surface perpendicularly. In other words, the ratio at which light reaching the retroreflecting member 4R is retroreflected as retroreflected light depends on the incident angle, and the direction f is a direction in which the retroreflection efficiency becomes lowest.

The optical axis of the light receiving unit 40 is set in the direction X, and the direction f is a direction in which an angle formed with the optical axis becomes largest. It is known that the lens characteristic of a general optical lens degrades the performance as an angle formed with the optical axis becomes larger. Owing to a decrease in light collection efficiency in the direction f, this direction is a direction in which light becomes darkest.

From this, even if the light projecting unit 30 can project light at a predetermined intensity regardless of the direction, retroreflected light detectable by the light receiving unit 40 becomes weak as the direction changes from the direction j toward the direction f, compared to retroreflected light returned from the direction j (see FIG. 3B).

In contrast, the infrared LED 31 is generally configured to maximize the radiation intensity of light in the optical axis direction. As an angle formed with the optical axis increases, the radiation intensity decreases. In general, the degree of decrease is defined by an angle "half-value angle" at which the radiation intensity becomes half the illumination intensity in the optical axis direction (see FIG. 3C).

Considering this, the optical axis of the light projecting unit 30 is pointed in the direction f in which the retroreflected light level is lowest. This increases the illumination intensity in the direction f, and decreases the illumination intensity as the direction relatively changes from the direction f to the direction j. Since the intensity of detectable retroreflected light can be uniformed between the direction j and the direction f (see FIG. 3D), a more stable signal can be obtained regardless of the direction.

In the embodiment, based on the radiation intensity distribution of the infrared LED 31, the optical axis of the light projecting unit 30 is pointed in the direction f in which the retroreflected light level is lowest. However, the angle of inclination of the light projecting unit 30 with respect to the light receiving unit 40 is not limited to this. For example, when an optical system in which the optical axis of the projection lens 32 itself becomes asymmetric is mounted, the light amount distribution and the radiation intensity distribution in FIG. 3C also become asymmetric. In this case, the angle of inclination of the light projecting unit 30 with respect to the light receiving unit 40 may be set so that a direction in which the asymmetric distribution becomes maximum coincides with the direction f.

Details of the arrangement of the sensor bar 1L will be explained with reference to FIGS. 4A to 4C. Although the sensor bar 1L receives attention and is explained with reference to FIGS. 4A to 4C, the sensor bar 1R also has the same arrangement.

As described above, a purpose of the apparatus is to attach the two sensor bars 1L and 1R to, for example, a flat whiteboard or wall surface so that the user can directly touch and operate a display screen projected on the whiteboard or wall surface. The size of the display screen is arbitrarily set by the user in accordance with the size of the whiteboard or that of the wall surface, and is not a fixed value. Further, whiteboards of various sizes are commercially available, and standard sizes capable of projecting a large screen as the projection screen are dimensions of 900×1,200 mm, 900×1,800 mm, and 1,200×1,800 mm.

However, these dimensions do not define ranges effectively used as the whiteboard, and are often dimensions containing the housing frame around the four sides of the whiteboard 6. An actually usable flat region is smaller, and its size varies depending on the manufacturer under the present circumstances.

To cope with this, in the coordinate input apparatus according to the present invention, a stretching/contraction mechanism is arranged in the sensor bar 1 so that the length of the sensor bar 1, in other words, the distance between the sensors of the two sensor units 2 incorporated in the sensor bar 1 is changeable. In practice, the outer length of the sensor bar 1 can be changed from 820 mm to 1,200 mm so that the sensor bar 1 can be attached to a flat portion having a size of 820 mm to 1,200 mm in a whiteboard having a vertical dimension of 900 mm to 1,200 mm.

In FIG. 1, the stretching/contraction amount is set based on the vertical dimension of the whiteboard on the assumption that the sensor bars are attached at two, left and right portions to the whiteboard. However, the present invention is not limited to this. For example, assuming that the sensor bars are attached not at two, left and right portions but at two, upper and lower portions to the whiteboard, the maximum dimension of the sensor bar 1 upon stretching is set to be longer. Further, assuming that the sensor bars are used even for a larger screen projected on a wall surface or the like, the stretching/contraction amount of the sensor bar is set in accordance with the size of an assumed maximum display screen.

In the present invention, when the sensor bars are assumed to be attached to a whiteboard, attaching the sensor bars at left and right portions is considered to be superior to attaching them at upper and lower portions.

As the first reason, considering the aspect ratio of the display apparatus and that of the whiteboard, when a maximum display region is set on the whiteboard, blank portions (regions where nothing is displayed) are generated in the left and right regions of the whiteboard. Hence, setting the sensor bars 1 at the blank portions can prevent a problem that the sensor bars 1 downsize a display image. In other words, an operational environment capable of using a larger screen can be provided.

The second reason is as follows. Generally, the display screen is horizontally elongated at an aspect ratio of 16:9 or the like. To enable a touch operation in a region equal to the display screen, the sensor units according to the present invention need to be arranged at the corners of the display screen. Thus, arranging the sensor bars 1 at left and right portions on the display screen can suppress the lengths of the sensor bars 1, compared to arranging them at upper and lower portions.

One purpose of the coordinate input apparatus according to the present invention is to carry it to a meeting room or the like of the user's choice, and quickly use it by using a whiteboard already installed in the meeting room or the wall surface of the meeting room. For this purpose, the sensor bars 1 are made compact and lightweight and attached at left and right portions at which the lengths of the sensor bars 1 can be suppressed.

The third reason is that left-and-right attachment facilitates installation. In other words, in upper-and-lower attachment, if the display screen becomes large, the user needs to prepare a stepladder or the like and do high-place work to attach the sensor bar 1 on the upper side. Depending on the display size, the upper-and-lower attachment sometimes makes installation difficult.

FIG. 4A shows the schematic arrangement of the sensor bar 1. The sensor bar 1 is formed from an upper housing 51 and lower housing 52. Reference numeral 53 denotes an outer pipe; and 54, an inner pipe. The inner diameter of the outer pipe 53 and the outer diameter of the inner pipe 54 substantially fit with each other. The outer pipe 53 is fixed to the upper housing 51, and the inner pipe 54 is fixed to the lower housing 52. When the length of the sensor bar 1 is increased or decreased by the upper housing 51 and lower housing 52, the outer pipe 53 and inner pipe 54 slide while keeping fitting with each other (see FIG. 4B). In the present invention, these pipes are made of a metal to obtain the stretching/contraction direction and mechanical strength of the sensor bar 1 in the stretching/contraction operation. One end of the metal pipe is drawn and crushed. At this portion, the pipe is mechanically coupled to the housing, and the sensor unit 2 is mounted.

In the present invention, the optical axis of the light receiving unit 40 of the sensor unit 2 is arranged in a direction perpendicular to the stretching/contraction direction of the sensor bar 1. As described above, the field range of the light receiving unit 40 is set to be asymmetric to the optical axis. With this arrangement, the housing of the sensor bar 1 can be formed to be thin. This is because the longitudinal direction of the line CCD 41 and that of a circuit board (not shown) on which the line CCD 41 is mounted coincide with the longitudinal direction of the sensor bar 1, and the line CCD 41 and circuit board are arranged efficiently. Also, the mounting surface of a circuit board on which the line CCD 41 serving as a photoelectric converter is mounted is arranged to be almost perpendicular to the effective coordinate input region 5.

FIG. 4C exemplifies a light projecting unit which employs a conventional centered optical system. To ensure a field range necessary for the light receiving unit 40, the optical axis of the optical system of the light receiving unit 40 has to be inclined with respect to the sliding direction of the sensor bar. As a result, the width Lw of the sensor bar 1 which stores the optical system becomes larger than the width of the sensor bar 1 in the embodiment of the present invention. This upsizes the housing, increases the weight, impairs portability, and increases the area necessary for mounting the sensor bar. Thus, attaching the sensor bar to a whiteboard or the like reduces the projection area of the display apparatus.

A case in which a centered optical system is used, the optical system of the light receiving unit 40 is set in a direction perpendicular to the sliding direction of the sensor bar 1, and the optical system deflects a beam to ensure a necessary field range in FIG. 4C will be examined. Since new optical elements such as a mirror are inserted in the optical path, the sensor unit 2 inevitably becomes large. Even in this arrangement, the width Lw of the sensor bar 1 increases, compared to the use of a decentered optical system in the present invention.

Further, a case in which a field range of ±50° centered on the optical system (for example, optical axis) of the light receiving unit 40 having a sufficiently large field range is employed will be examined. In FIG. 3A, the field range of the light receiving optical system is a range of the direction h to the direction m, and has an angle Xoh=angle Xom=50° with respect to the optical axis direction X. A field range necessary for the coordinate input apparatus according to the present invention is only a range (range of the direction f to the direction j) which covers the entire region of the retroreflecting member 4 arranged on a facing side. For this reason, almost the half field range on one side (range of the direction j to the direction m) becomes an ineffective region. Even in this case, the effective field range of the light receiving unit 40 is equal to a field range obtained when a substantially decentered optical system is adopted.

Figure 5A:
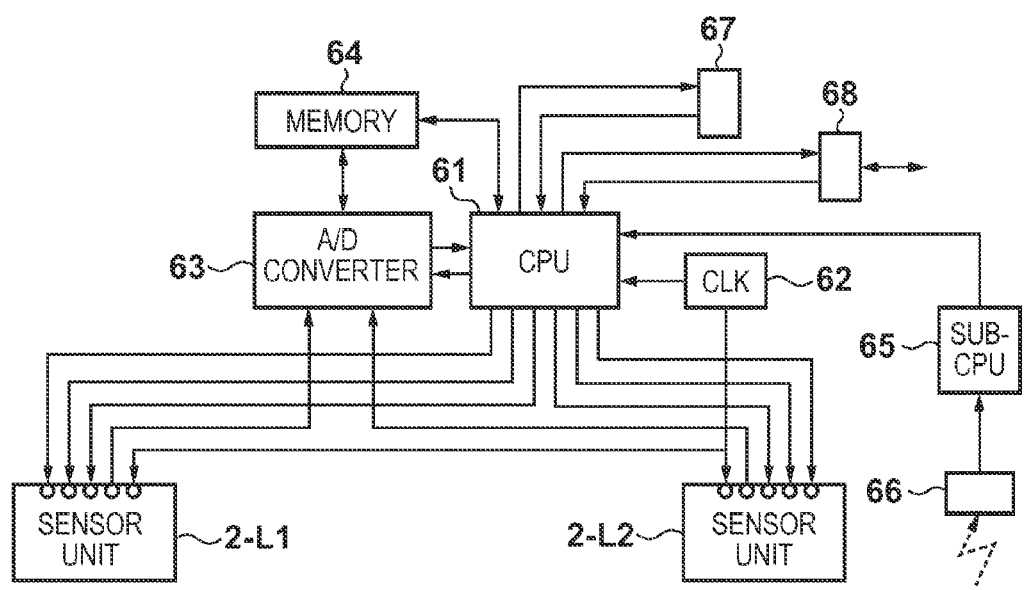
FIG. 5A is a block diagram for explaining the operation of an arithmetic control circuit in the first detection mode according to the embodiment.

FIG. 5A is a block diagram showing the arithmetic control circuit 3. The arithmetic control circuit 3L of the sensor bar 1L and the arithmetic control circuit 3R of the sensor bar 1R in the embodiment have the same circuit arrangement except for an external interface specification, and perform control of the corresponding connected sensor units 2 and arithmetic processing. FIG. 5A particularly shows the arrangement of the arithmetic control circuit 3L of the sensor bar 1L.

A CPU 61 formed from a one-chip microcomputer or the like outputs CCD control signals for the line CCDs 41 of the sensor units 2-L1 and 2-L2, and performs control of the shutter timings and data output of the line CCDs 41, and the like. CCD clocks are transmitted from a clock generator CLK 62 to the sensor units 2-L1 and 2-L2, and also input to the CPU 61 in order to perform various control operations in synchronism with the line CCDs 41. Note that the CPU 61 supplies LED driving signals for driving the infrared LEDs 31 of the sensor units 2-L1 and 2-L2.

An A/D converter 63 receives detection signals from the line CCDs 41 of the sensor units 2-L1 and 2-L2, and converts them into digital values under the control of the CPU 61. A memory 64 stores the converted digital values to use them for angle calculation. A geometric touch position is calculated from the calculated angle information, and output to an information processing apparatus such as an external PC via an interface 68 (for example, a USB interface).

As described above, the arithmetic control circuit 3 of each sensor bar 1 controls the two sensor units 2. When the arithmetic control circuit 3L of the sensor bar 1L serves as the main function, the CPU 61 transmits a control signal to the arithmetic control circuit 3R of the sensor bar 1R via a serial communication unit 67 to synchronize the circuits. Then, the CPU 61 acquires necessary data from the arithmetic control circuit 3R.

The operation between the arithmetic control circuits 3L and 3R is executed by master-slave control. In the embodiment, the arithmetic control circuit 3L serves as the master, and the arithmetic control circuit 3R serves as the slave. Note that each arithmetic control circuit can become either the master or slave, and a switching unit such as a DIP switch (not shown) can switch the arithmetic control circuit between the master and the slave by inputting a switching signal to the CPU port.

To acquire data from the sensor units 2-R1 and 2-R2 of the sensor bar 1R arranged on a facing side, the arithmetic control circuit 3L of the sensor bar 1L serving as the master transmits a control signal to the arithmetic control circuit 3R serving as the slave via the serial communication unit 67. Angle information obtained by the sensor units 2-R1 and 2-R2 is calculated and transmitted to the arithmetic control circuit 3L serving as the master via the serial communication unit 67.

In the embodiment, the interface 68 is mounted on the arithmetic control circuit 3L serving as the master. An infrared receiving unit 66 is a pointer when a special-purpose pen (not shown) for emitting an infrared ray is used. A sub-CPU 65 decodes a signal from the special-purpose pen. The special-purpose pen includes a switch which detects pressing of the input surface by the pen tip, and various switches arranged on the side of the pen housing. The operation state of the special-purpose pen can be detected by transmitting the states of these switches and pen identification information from an infrared emitting unit arranged in the special-purpose pen.

Figure 5B:
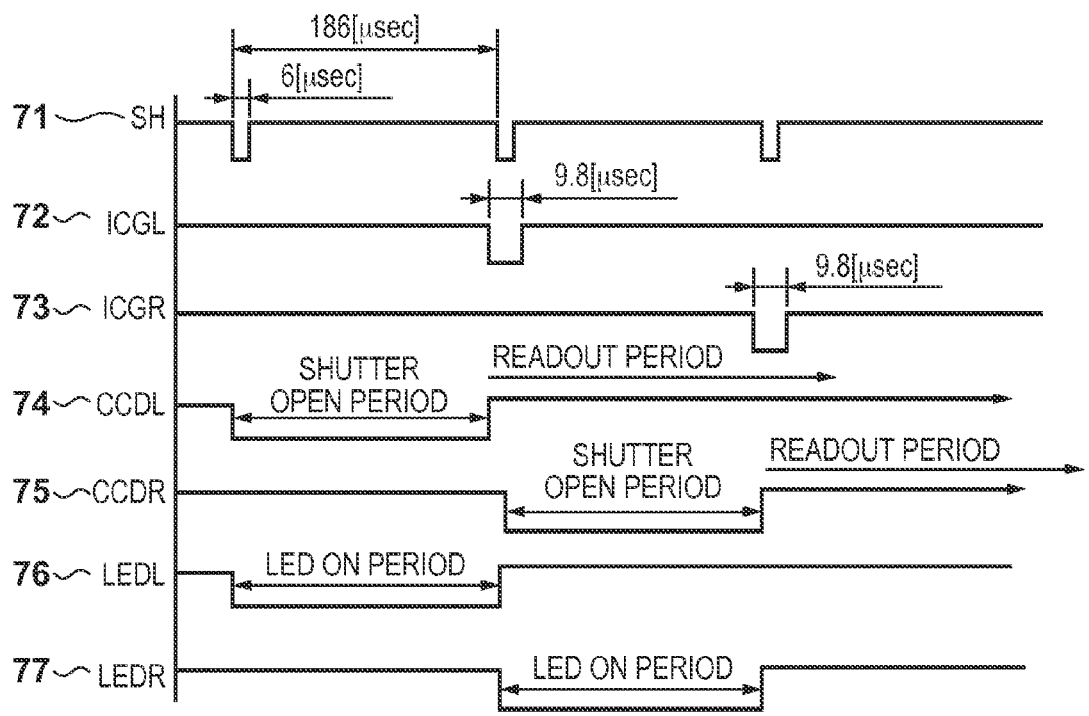
FIG. 5B is a timing chart for explaining the operation of the arithmetic control circuit in the first detection mode according to the embodiment.

FIG. 5B is a timing chart showing control signals output from the CPU 61 of the arithmetic control circuit 3L serving as the master to operate the sensor unit 2, and the operation of the sensor unit 2.

Reference numerals 71, 72, and 73 denote control signals for controlling the line CCD 41. The interval of the SH signal 71 determines the shutter open time of the line CCD 41. The ICGL signal 72 is a gate signal to the sensor units 2-L1 and 2-L2 of the sensor bar 1L, and is a signal for transferring charges in the photoelectric converter of the line CCD 41 to a readout unit.

A CCDL signal 74 is a signal representing the shutter open time of the line CCDs 41 of the sensor units 2-L1 and 2-L2. The ICGR signal 73 is a gate signal to the sensor units 2-R1 and 2-R2 of the facing sensor bar 1R, and is transmitted to the arithmetic control circuit 3R of the sensor bar 1R via the serial communication unit 67. Then, the arithmetic control circuit 3R generates a signal for transferring charges in the photoelectric converter of the line CCD 41 to the readout unit. A CCDR signal 75 is a signal representing the shutter open time of the line CCDs 41 of the sensor units 2-R1 and 2-R2.

An LEDL signal 76 and LEDR signal 77 are driving signals for the infrared LEDs 31 of the sensor units 2. To turn on the infrared LEDs 31 of the sensor units 2-L1 and 2-L2 of the sensor bar 1L in the first cycle of the SH signal 71, the LEDL signal 76 is supplied to the infrared LEDs 31 via LED driving circuits (not shown).

To turn on the infrared LEDs 31 of the sensor units 2-R1 and 2-R2 of the sensor bar 1R arranged on a facing side in the next cycle of the SH signal 71, the LEDR signal 77 is supplied to the arithmetic control circuit 3R via the serial communication unit 67. Then, the arithmetic control circuit 3R generates a signal to be supplied to the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the sensor bar 1L and the sensor units 2-R1 and 2-R2 of the facing sensor bar 1R operate at different timings. With this arrangement, only retroreflected light of light emitted by the sensor unit itself can be detected without detecting infrared light of the sensor unit arranged on a facing side.

Figure 6A:
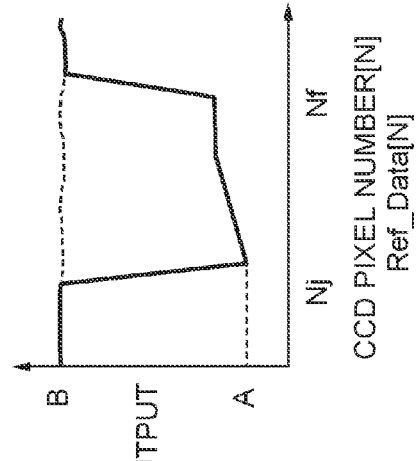
FIG. 6A is a graph for explaining processing of a detection signal waveform according to the embodiment.
Figure 6B:
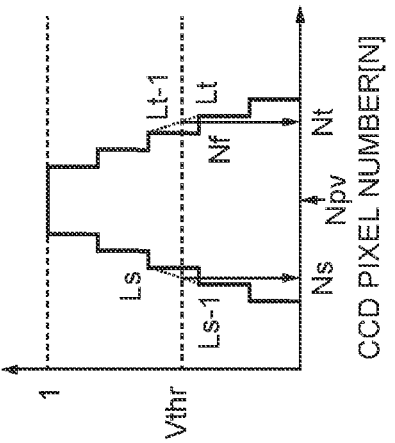
FIG. 6B is a graph for explaining processing of the detection signal waveform according to the embodiment.

A signal output from the sensor unit 2 of the sensor bar 1 will be explained with reference to FIGS. 6A to 6D. FIG. 6A shows an output from the light receiving unit 40 when the light projecting unit 30 of the sensor unit 2 does not emit light. FIG. 6B shows an output from the light receiving unit 40 when the light projecting unit 30 of the sensor unit 2 emits light. In FIG. 6B, a level A is the maximum level of a detected light amount, and a level B is a level at which no light is detected (received).

An infrared ray emitted by the sensor unit 2 is retroreflected by the retroreflecting member 4 arranged on a facing side, and detected by the sensor unit 2 itself. The direction of a pixel number Nj at which an optical output starts to be obtained is the direction j in FIG. 6A. Similarly, the direction of a pixel number Nf is the direction f in FIG. 6A. The light amount from the pixel number Nj to the pixel number Nf changes depending on the size and aspect ratio of the display screen, a corresponding arrangement state (especially the distance between the two sensor bars 1) and stretching/contraction state of the sensor bar 1, and the like.

To obtain an optimum light amount level, the coordinate input apparatus according to the present invention controls the SH signal to adjust the shutter open time of the line CCD 41 and the exposure time of the infrared LED 31. The time can be set to be short if a light amount obtained from the sensor unit 2 is large, and long if it is small. Further, a current to be supplied to the infrared LED 31 may be adjusted depending on a detected light amount level. The coordinate input apparatus is configured to obtain an optimum light amount by monitoring an output signal in this manner. This adjustment may be performed, as needed, when the level varies. Alternatively, when the sensor bar 1 is set and holds the state, the light amount may be adjusted upon power-on after the completion of installation because a stable predetermined signal should be obtained.

Referring back to FIGS. 6A to 6D, when the user touches the input surface of the effective coordinate input region 5 and cuts off the optical path, no light amount can be detected at, for example, the pixel number Nc, as shown in FIG. 6C. In the present invention, a direction in which the input surface has been touched, that is, an angle is calculated using signals in FIGS. 6A to 6C.

First, reference data is acquired upon activation of the system, upon reset of the system, or automatically. Although data processing of one sensor unit 2 will be explained below, the remaining sensor units also perform the same processing.

Upon power-on, while the operator does not perform a touch operation and the illumination by the light projecting unit 30 is OFF, the A/D converter 63 A/D-converts an output from the line CCD 41, and the memory 64 stores the value as Base_Data[N]. This data contains variations of the bias of the line CCD 41 and is data around the level B in FIG. 6A. [N] is the CCD pixel number of the line CCD 41, and a pixel number corresponding to the effective input range is used.

Similarly, a light amount distribution in a state in which the operator does not perform a touch operation and the illumination by the light projecting unit 30 is ON is acquired and stored. This data is data indicated by a solid line in FIG. 6B, and is stored as Ref_Data[N] in the memory 64. The storage of these two types of data are managed as initial data.

After that, sampling starts. If no touch operation is performed, the data shown in FIG. 6B is obtained. If a touch operation is performed, data shown in FIG. 6C in which a shadow C has been detected in accordance with the touch position is detected. The sample data obtained when the illumination by the light projecting unit 30 is ON is defined as Norm_Data[N].

By using these data (Base_Data[N] and Ref_Data[N] stored in the memory 64), the presence/absence of an input from the pointer and the presence/absence of a light shielding portion are determined. First, to specify a light shielding portion, the absolute amount of a change of data is calculated in each pixel and compared with a preset threshold Vtha:

$$\text{Norm\_Data0}[N] = \text{Norm\_Data}[N] - \text{Ref\_Data}[N] \qquad (1)$$

where Norm_Data0[N] is the absolute change amount in each pixel. By comparison with the threshold, a determination error caused by noise or the like is prevented, and a reliable change of a predetermined amount is detected. If data exceeding the threshold is generated in, for example, a predetermined number or more of successive pixels, it is determined that a touch operation has been performed. Since this processing only calculates a difference and compares it, the calculation can be executed within a short time and the presence/absence of an input can be determined quickly.

Then, for higher-accuracy detection, the change ratio of pixel data is calculated, and an input point is determined using equation (2):

$$\text{Norm\_Data}R[N]=\text{Norm\_Data0}[N]/(\text{Base\_Data}[N]-\text{Ref\_Data}[N]) \quad (2)$$

For this pixel data (light amount distribution), a separately set threshold Vthr is applied. Then, the angle is calculated by obtaining, as a pixel corresponding to the input from the pointer, the center between pixel numbers at the leading edge and trailing edge of a light amount variation region corresponding to the light shielding portion in the light amount distribution, which correspond to points crossing the threshold Vthr.

Figure 6C:
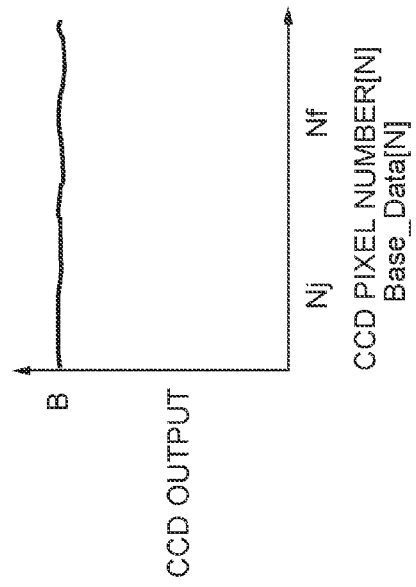
FIG. 6C is a graph for explaining processing of the detection signal waveform according to the embodiment.
Figure 6D:
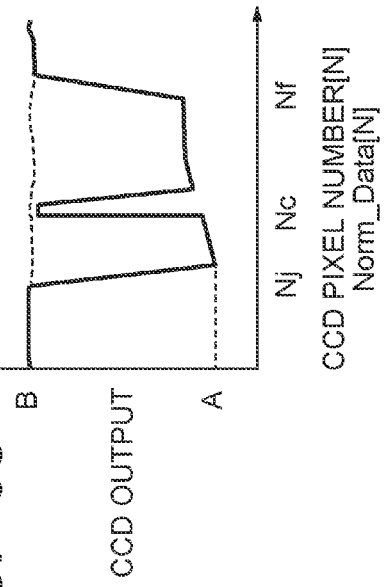
FIG. 6D is a graph for explaining processing of the detection signal waveform according to the embodiment.

FIG. 6D exemplifies a detection result after the end of calculating the change ratio. Assume that the threshold Vthr is used for detection, and the leading edge of the light shielding portion reaches a level Ls in the Ns-th pixel and exceeds the threshold Vthr. Further, assume that the pixel data reaches a level Lt in the Nt-th pixel and becomes lower than the threshold Vthr.

At this time, calculation may be performed by setting, as the center value between pixel numbers at the leading edge and the trailing edge, the pixel number Np of the line CCD 41 that should be output, as represented by equation (3):

$$Np=Ns+(Nt-Ns)/2 \quad (3)$$

In this case, the pixel interval of the line CCD 41 serves as the resolution of the output pixel number.

For higher-resolution detection, a virtual pixel number at which the threshold Vthr is crossed is calculated using the data level of each pixel and that of an immediately preceding adjacent pixel.

Letting Ls be the level of the pixel Ns, Ls-1 be that of the pixel Ns-1, Lt be that of the pixel Nt, and Lt-1 be that of the pixel Nt-1, virtual pixel numbers Nsv and Ntv can be calculated as $$Nsv=Ns\text{-}1+(Vthr-Ls\text{-}1)/(Ls-Ls\text{-}1) \quad (4)$$

$$Ntv=Nt\text{-}1+(Vthr-Lt\text{-}1)/(Lt-Lt\text{-}1) \quad (5)$$

According to these calculation equations, virtual pixel numbers corresponding to the output level, that is, pixel numbers finer than those of the line CCD 41 can be acquired. A virtual center pixel Npv between the virtual pixel numbers Nsv and Ntv is determined by equation (6):

$$Npv=Nsv+(Ntv-Nsv)/2 \quad (6)$$

In this fashion, higher-resolution detection can be implemented by calculating virtual pixel numbers crossing the threshold Vthr of the predetermined level from the pixel numbers of pixels of data levels crossing the threshold Vthr, adjacent pixel numbers, and their data levels.

To calculate the actual coordinate value of the pointer from the thus-obtained center pixel number, the center pixel number needs to be converted into angle information.

In actual coordinate calculation to be described later, it is more convenient to calculate not an angle itself but a tangent value at this angle. Note that a pixel number is converted into $\tan \theta$ by looking up a table or using a transformation. When a high-order polynomial is used as the transformation, the accuracy can be ensured. However, it suffices to determine the order and the like in consideration of the calculation ability, accuracy, and the like.

The use of a fifth-order polynomial will be exemplified. When the fifth-order polynomial is used, six coefficients are necessary, and these coefficient data are stored in a memory such as a nonvolatile memory in shipment or the like. Letting L5, L4, L3, L2, L1, and L0 be the coefficients of the fifth-order polynomial, $\tan \theta$ can be expressed by $$\tan \theta=((((L5*Npr+L4)*Npr+L3)*Npr+L2)*Npr+L1)*Npr+L0 \quad (7)$$

By executing the same processing for the respective sensor units, respective angle data can be determined. Although $\tan \theta$ is calculated in the above example, angle data itself may be calculated and then $\tan \theta$ may be calculated.

Figure 7A:
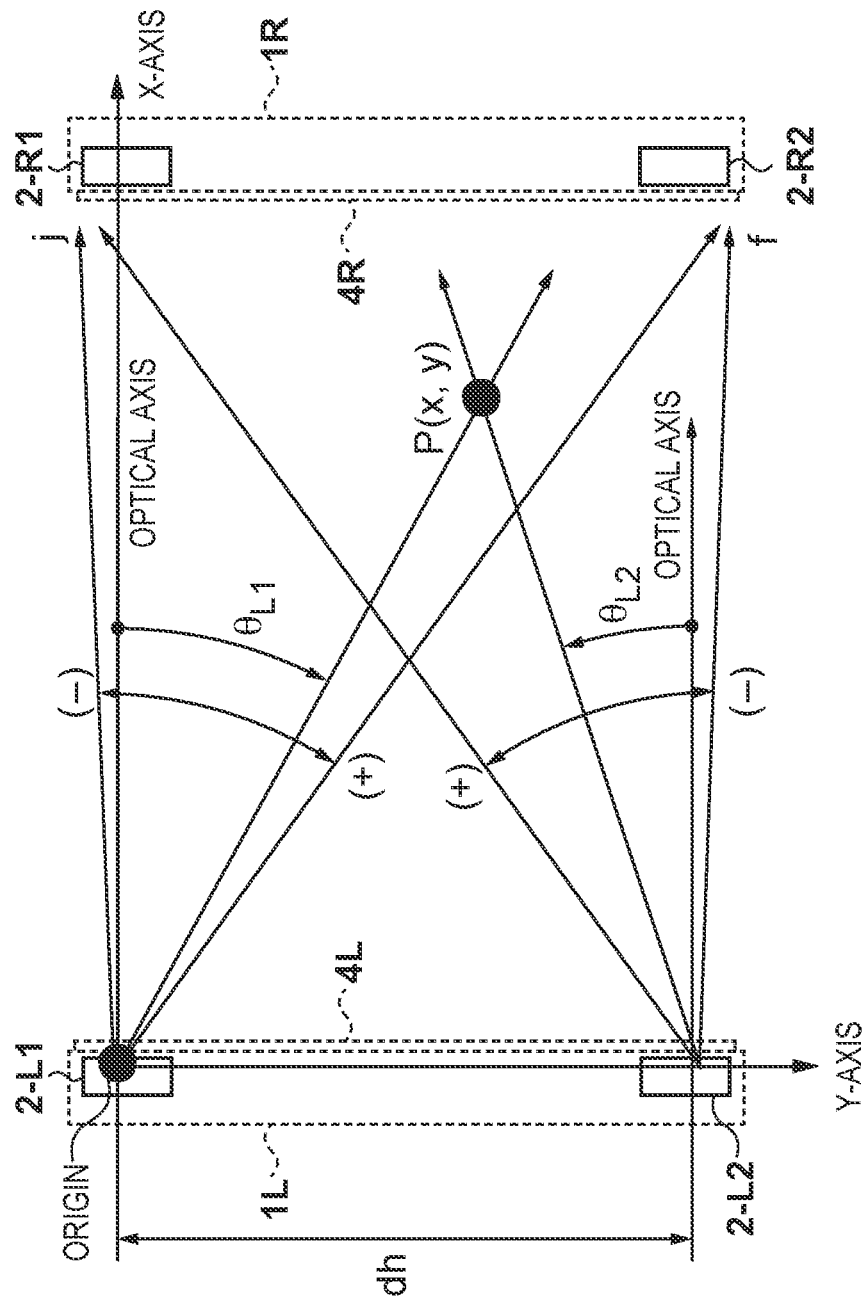
FIG. 7A is a view for explaining coordinate calculation according to the embodiment.

FIGS. 7A to 7F are views showing a positional relationship with screen coordinates. The field range of the sensor unit 2-L1 of the sensor bar 1L is a range of the direction j to the direction f, and the sign of the angle is set as shown in FIG. 7A. The optical axis of the sensor unit 2-L1 is the X-axis direction, and its direction is defined as an angle of 0°. Similarly, the field range of the sensor unit 2-L2 is a range of the direction f to the direction j, the sign of the angle is set as shown in FIG. 7A, and the optical axis direction of the sensor unit 2-L2 is defined as an angle of 0°. A line segment connecting the center of the optical axis of the sensor unit 2-L1 and that of the optical axis of the sensor unit 2-L2 is defined as the Y-axis. Then, the optical axis of each sensor unit serves as the normal direction of the line segment. Also, the distance between the center of the optical axis of the sensor unit 2-L1 and that of the optical axis of the sensor unit 2-L2 is defined as dh.

Assume that a touch operation is performed at the position of a point P.

An angle calculated by the sensor unit 2-L1 is $\theta L1$, and an angle calculated by the sensor unit 2-L2 is $\theta L2$. The coordinates of the touch position P can be geometrically calculated using these two pieces of angle information and the distance dh:

$$x=dh\cdot\tan(\Pi/2-\theta L2)\cdot\tan(\Pi/2-\theta L1)/(\tan(\Pi/2-\theta L2)+\tan(\Pi/2-\theta L1)) \quad (8)$$

$$y=dh\cdot\tan(\Pi/2-\theta L2)\cdot\tan(\Pi/2\theta L2)/(\tan(\Pi/2-\theta L1) \quad (9)$$

Even if an output from one sensor unit is $\theta L1=0$ or $\theta L2=0$, the touch position can be geometrically easily calculated based on angle information output from the other sensor unit.

Figure 7B:
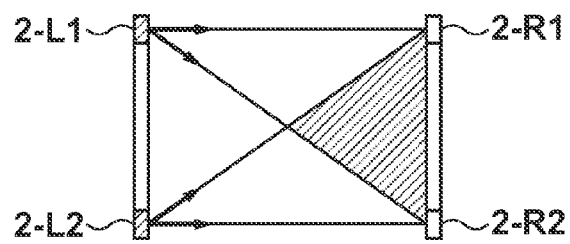
FIG. 7B is a view for explaining coordinate calculation according to the embodiment.
Figure 7C:
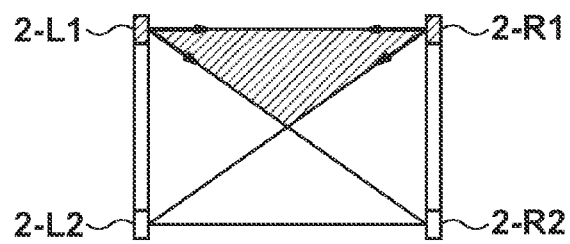
FIG. 7C is a view for explaining coordinate calculation according to the embodiment.
Figure 7D:
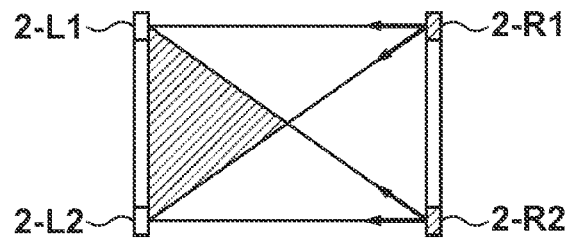
FIG. 7D is a view for explaining coordinate calculation according to the embodiment.
Figure 7E:
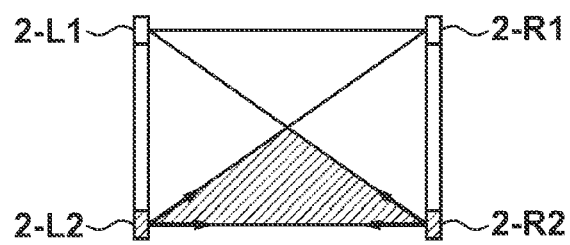
FIG. 7E is a view for explaining coordinate calculation according to the embodiment.

The touch position can be calculated only when the touch position P exists in a hatched range in FIG. 7B out of the field ranges of the sensor units 2-L1 and 2-L2. When no touch position exists in this range, a touch position in the entire effective coordinate input region 5 can be detected by changing a combination of sensor units used for calculation, as shown in FIGS. 7C, 7D, and 7E. Therefore, sensor units necessary for coordinate calculation are selected based on the presence/absence of a light shielding direction detected by each sensor unit 2 and the light shielding direction, and the touch position is calculated. Then, the parameters in equations (8) and (9) are changed in accordance with a combination of the selected sensor units 2, and coordinate transformation is performed.

Figure 7F:
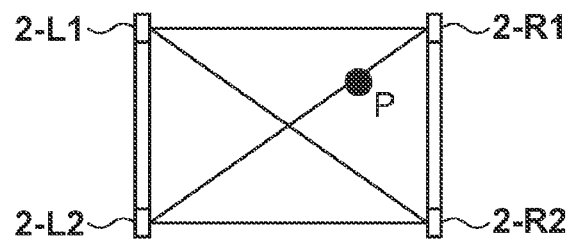
FIG. 7F is a view for explaining coordinate calculation according to the embodiment.

As shown in FIG. 7F, the touch position P may exist near a sensor unit selection boundary region. In this case, the touch position can be calculated by a combination of sensor units in the state of FIG. 7B or 7C. As a detailed arrangement, for example, the field range of the sensor unit 2-L2 and that of the sensor unit 2-R1 overlap each other in the diagonal direction of the effective coordinate input region 5. When the user touches the overlapping region, coordinates can be calculated by a plurality of sensor unit combinations. In this case, the average value of coordinate values calculated by a combination of sensor units may be output as determined coordinates.

Figure 8:
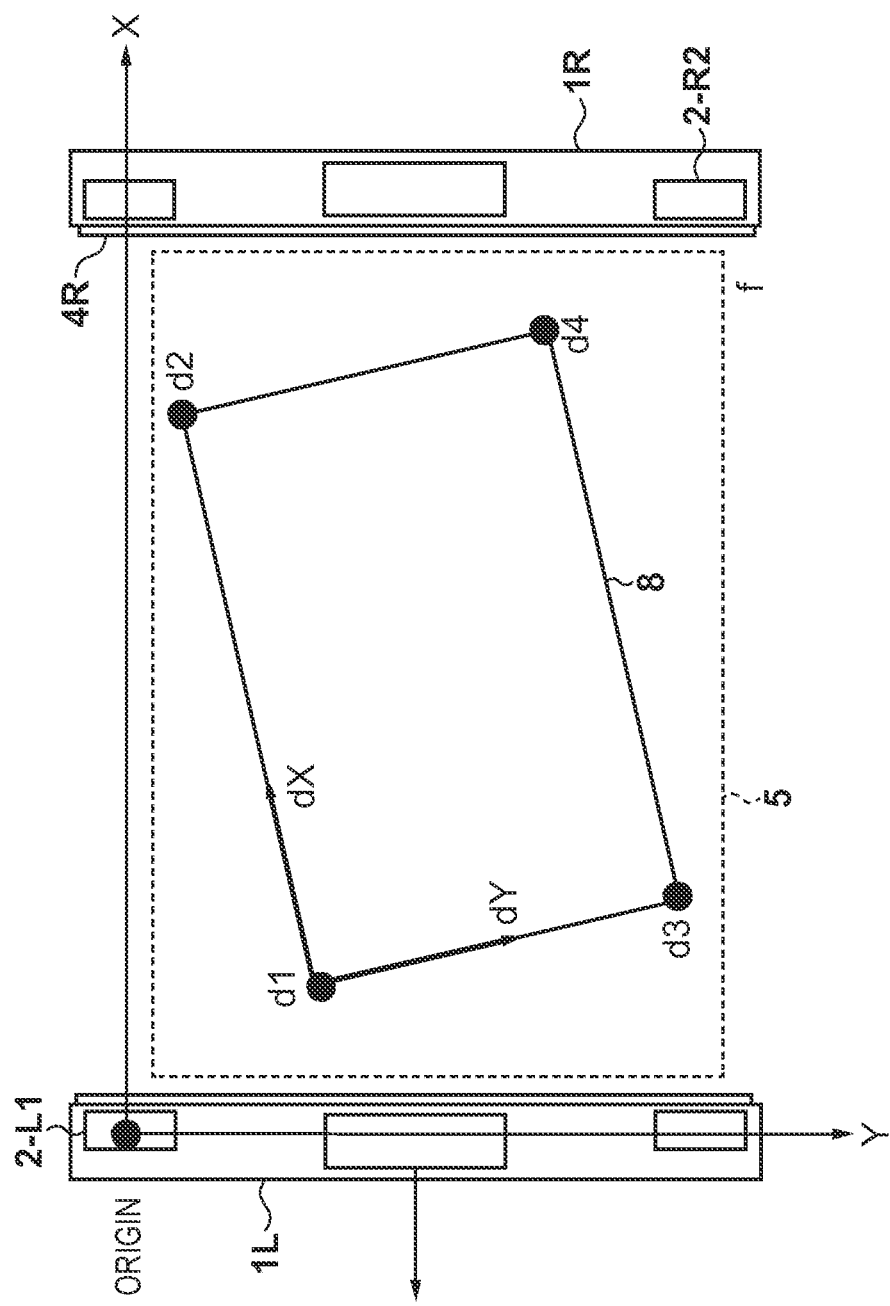
FIG. 8 is a view for explaining a digitizer coordinate system and screen coordinate system according to the embodiment.

The thus-calculated coordinate value is the value of the first coordinate system (to be referred to as a digitizer coordinate system hereinafter) of the coordinate input apparatus according to the present invention, and the effective region where position calculation is possible is the effective coordinate input region 5 in FIG. 3A. The display surface of the display is set within the range of the effective coordinate input region 5. If the display is a front projector, a display region 8 serving as a projected image is set in the effective coordinate input region 5, as shown in FIG. 8. In FIG. 8, the display region has the second coordinate system (to be referred to as a screen coordinate system hereinafter) serving as a display coordinate system which has an origin d1 and is defined by the dX axis and dY axis. To perform a tap operation for an icon or the like by directly touching a displayed image, the digitizer coordinate system and screen coordinate system need to be correlated.

To obtain the correlation, dedicated application software is generally installed in a personal computer (PC) which performs display control. When the application is activated, a cross or the like is displayed on the display screen to prompt the user to touch the cross position. The coordinate system is transformed so that a coordinate value in the digitizer coordinate system that is obtained by repeating this operation at different positions by a predetermined number of times, and a coordinate value in the screen coordinate system at the position where the cross is displayed coincide with each other.

The coordinate input apparatus according to the present invention performs this coordinate transformation by prompting the user to touch the four corners of the display screen, instead of displaying a cross position by using the application software and prompting the user to touch it. This arrangement has a great effect of quickly using the coordinate input apparatus by connecting it to an on-site PC without installing special software. Especially, the coordinate input apparatus according to the present invention is greatly advantageous because it is portable and is installed in a meeting room by carrying the sensor bars 1 without carrying a PC together. The coordinate input apparatus according to the present invention has a great effect of using it immediately upon completion of easy installation using a PC and display apparatus at a place to which the coordinate input apparatus has been carried.

Transition to the mode in which these coordinate systems are made to coincide with each other is performed by, for example, a mode transition switch (not shown) arranged on the sensor bar 1. Upon mode transition by the mode transition switch, an output unit such as a loudspeaker incorporated in the sensor bar 1 gives guidance to sequentially touch the four corners. Every time the corner is touched, a buzzer sound may be output to represent the completion of the input. Alternatively, an indicator incorporated in the sensor bar 1 may prompt the operation.

In coordinate calculation in the digitizer coordinate system, the distance dh between the sensor units 2 used in calculation of equations (8) and (9) needs to be known in advance. However, in a use form as shown in FIG. 8 in which the coordinate input apparatus is used in combination with the display apparatus, the distance dh need not always be known in advance. More specifically, information about the four corners representing a display size is sequentially acquired as angle information in each sensor unit in the digitizer coordinate system by a touch operation. As a result, the coordinates of a touch position in the screen coordinate system can be calculated by only ratio-based calculation.

The coordinate input apparatus according to the present invention assumes that the user attaches the two sensor bars 1 to display screens of various display sizes. After the two sensor bars have a relative positional relationship in FIG. 7A (the two sensor bars are parallel and have the same length, and the sensor unit of the other sensor bar is arranged in the X-axis direction), high-accuracy position detection in the digitizer coordinate system becomes possible. Although a mechanism which sets the two sensor bars 1 in this arrangement may be adopted, the user is forced to do careful installation work. If the user can easily attach the two sensor bars at a rough estimate, this improves convenience and greatly shortens the installation time. For higher convenience, therefore, the present invention employs the second detection mode as a coordinate detection mode.

Figure 9A:
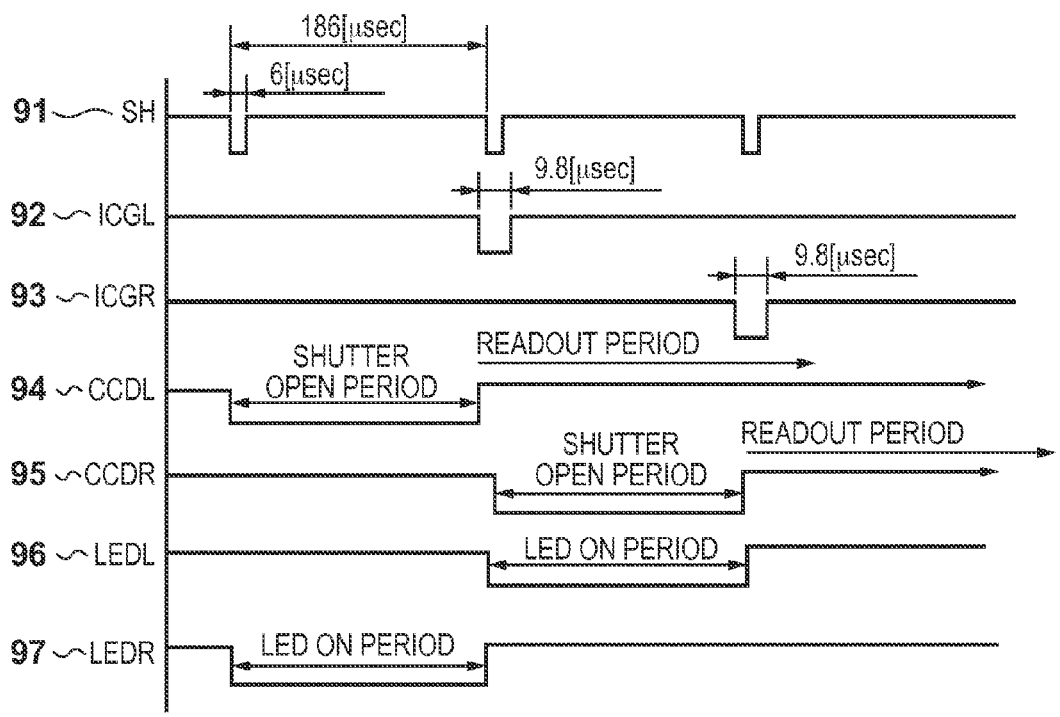
FIG. 9A is a timing chart for explaining the operation of the arithmetic control circuit in the second detection mode according to the embodiment.

FIG. 9A is a timing chart showing control signals output from the CPU 61 of the sensor bar 1L serving as the master, and the operation of the sensor unit 2 in order to explain the second detection mode.

Reference numerals 91, 92, and 93 denote control signals for controlling the line CCD 41. The interval of the SH signal 91 determines the shutter open time of the line CCD 41. The ICGL signal 92 is a gate signal to the sensor units 2-L1 and 2-L2 of the sensor bar 1L, and is a signal for transferring charges in the photoelectric converter of the line CCD 41 to a readout unit.

A CCDL signal 94 is a signal representing the shutter open time of the line CCDs 41 of the sensor units 2-L1 and 2-L2. The ICGR signal 93 is a gate signal to the sensor units 2-R1 and 2-R2 of the facing sensor bar 1R, and is transmitted to the arithmetic control circuit 3R of the sensor bar 1R via the serial communication unit 67. Then, the arithmetic control circuit 3R generates a signal for transferring charges in the photoelectric converter of the line CCD 41 to the readout unit. A CCDR signal 95 is a signal representing the shutter open time of the line CCDs 41 of the sensor units 2-R1 and 2-R2.

An LEDL signal 96 and LEDR signal 97 are driving signals for the infrared LEDs 31 of the sensor units 2. To turn on the infrared LEDs 31 of the sensor units 2-R1 and 2-R2 of the sensor bar 1R in the first cycle of the SH signal 91, the LEDR signal 97 is transmitted to the arithmetic control circuit 3R of the sensor bar 1R via the serial communication unit 67. Then, the arithmetic control circuit 3R generates a signal to be supplied to the LED driving circuits.

To turn on the infrared LEDs 31 of the sensor units 2-L1 and 2-L2 of the sensor bar 1L in the next cycle of the SH signal 91, the LEDL signal 96 is supplied to the infrared LEDs 31 via the LED driving circuits.

After the end of driving the infrared LED 31 and opening the shutter of the line CCD 41, a signal from the line CCD 41 is read out from the sensor unit 2, and angle information is calculated by a method to be described later. The arithmetic result of the arithmetic control circuit 3R serving as the slave is transmitted to the arithmetic control circuit 3L serving as the master.

By the above-described operation, the sensor units 2-L1 and 2-L2 of the sensor bar 1L directly detect infrared light emitted by the infrared LEDs 31 of the sensor units 2-R1 and 2-R2 of the facing sensor bar 1R. Similarly, the sensor units 2-R1 and 2-R2 of the sensor bar 1R directly detect infrared light emitted by the infrared LEDs 31 of the sensor units 2-L1 and 2-L2 of the facing sensor bar 1L.

Note that FIG. 5B shows a coordinate detection mode in which the sensor units 2-L1 and 2-L2 of the sensor bar 1L and the sensor units 2-R1 and 2-R2 of the facing sensor bar 1R operate at different timings. This coordinate detection mode is the first detection mode.

Figure 9B:
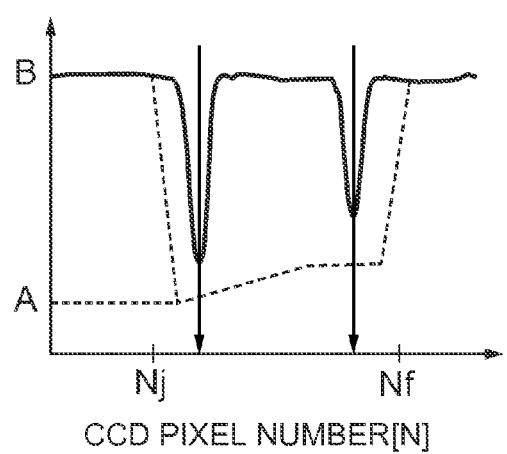
FIG. 9B is a graph for explaining the operation of the arithmetic control circuit in the second detection mode according to the embodiment.

FIG. 9B shows a detection signal waveform obtained by the sensor unit 2 when the coordinate input apparatus operates in the second detection mode. Beams emitted by the light projecting units 30 of the two sensor units 2 arranged on facing sides are received, so two peak signals are generated. The respective directions are calculated by the same method as the above-described angle calculation method. In FIG. 9B, a broken line indicates an output (light amount distribution) from the light receiving unit 40 shown in FIG. 6B, and represents that peak signals are generated between the direction Nj and the direction Nf.

One purpose of the present invention is to implement high-accuracy position detection even when the user attaches the two sensor bars 1 at a rough estimate, as described above. To achieve this, each sensor unit 2 detects light from the light projecting unit 30 of the sensor unit 2 stored in the facing sensor bar 1, thereby detecting a direction in which the facing sensor unit 2 is positioned.

This state will be explained with reference to FIG. 10.

Figure 10:
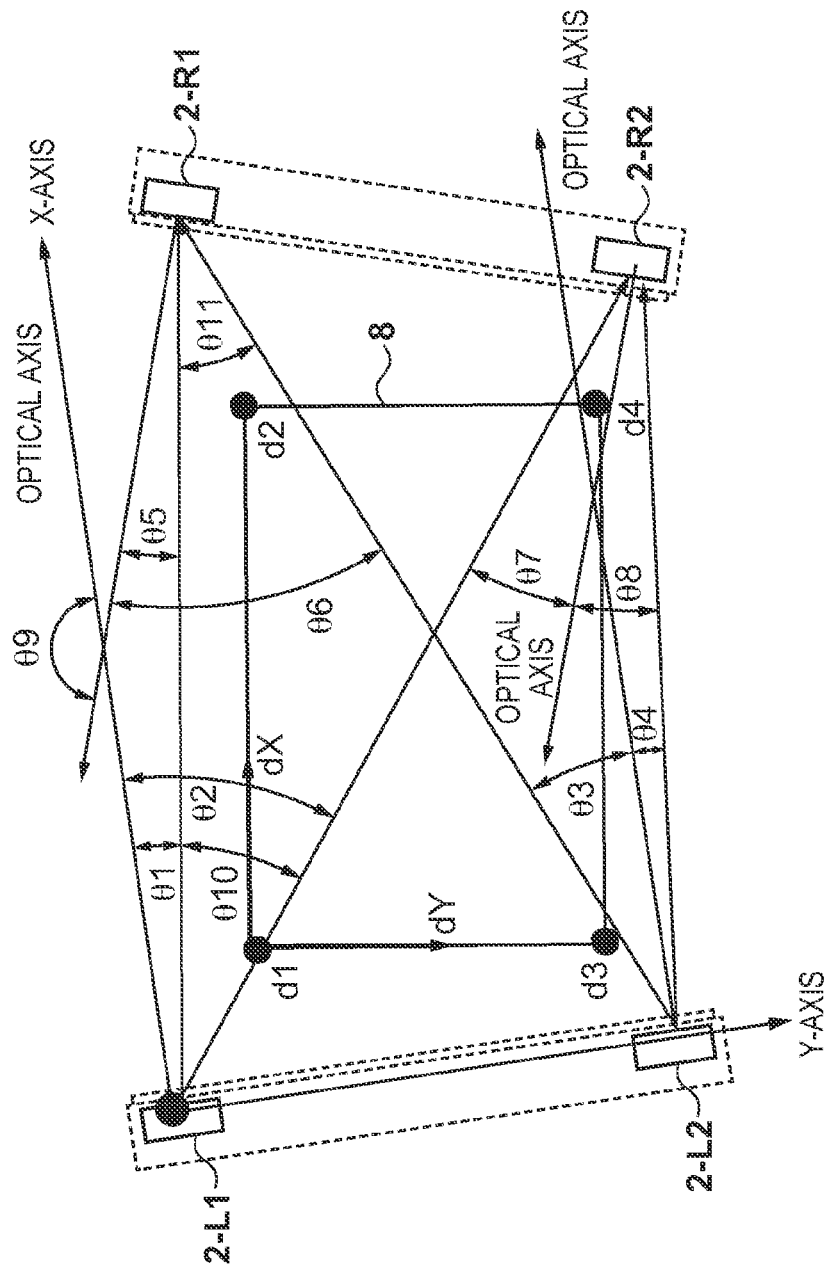
FIG. 10 is a view for explaining calculation of the relative positional relationship between the sensor units according to the embodiment.

In FIG. 10, a line segment connecting the center of the optical axis of the sensor unit 2-L1 and that of the optical axis of the sensor unit 2-L2 is defined as the Y-axis, and the normal direction is defined as the X-axis. The optical axes of the sensor units 2-L1 and 2-L2 are parallel to the X-axis. The facing sensor unit 2-R1 is positioned in a direction at an angle θ1 when viewed from the sensor unit 2-L1, and a direction at an angle θ3 when viewed from the sensor unit 2-L2. Similarly, angles from θ1 to θ8 can be calculated. As a result, an angle θ9 formed by the optical axis of the sensor unit 2-L1 of the sensor bar 1L and that of the sensor unit 2-R1 of the sensor bar 1R is calculated.

In other words, the relative inclinations of the sensor bars 1L and 1R can be detected. Further, even when the length of the sensor bar 1 in the longitudinal direction changes upon stretching/contraction, the relative positional relationship between the four sensor units can be acquired though the absolute distance between the sensor units 2 cannot be obtained. If the above-mentioned information about four corners representing a display size is acquired by a touch operation, coordinates in the screen coordinate system can be calculated at high accuracy by only ratio-based calculation.

Figure 11:
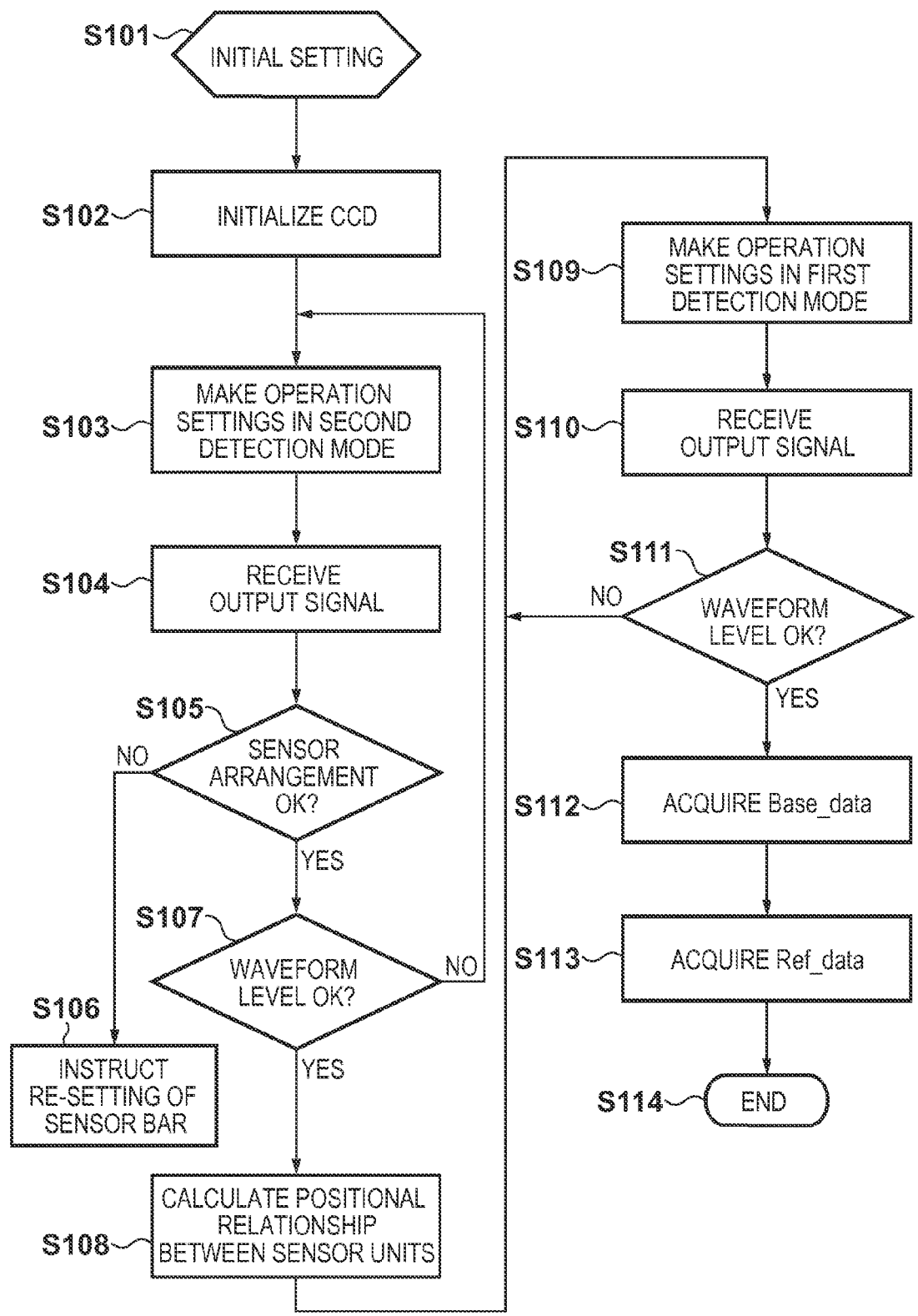
FIG. 11 is a flowchart showing initial setting processing according to the embodiment.
Figure 13:
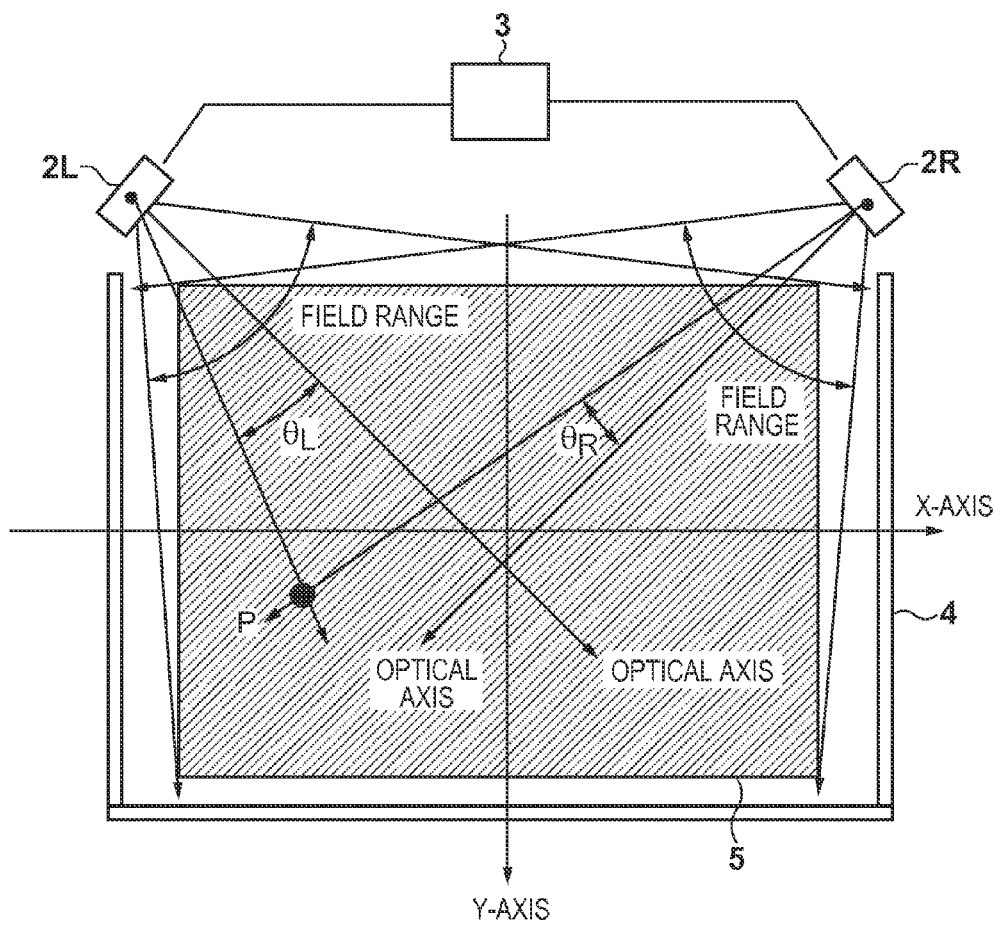
FIG. 13 is a view for explaining the basic arrangement of a conventional optical coordinate input apparatus.

FIG. 11 is a flowchart showing initial setting processing after power-on.

To form the rectangular effective coordinate input region 5 containing the entire display region 8 serving as a projected image, when the operator attaches the sensor bars 1 to the whiteboard 6, for example, the coordinate input apparatus is turned on and initial settings are performed (step S101).

Then, various initial settings regarding the coordinate input apparatus such as port setting of the CPU 61 and timer setting are performed. In addition, the line CCD 41 is also initialized to, for example, remove unwanted charges remaining in the photoelectric converter (step S102). A light amount to be detected by the line CCD 41 is optimized. As described above, the size of the display region 8 changes depending on the size of the whiteboard 6. Even in this case, the user appropriately sets the distance between the sensor bars 1 by stretching/contracting the sensor bars 1. Since the intensity of detected light changes depending on the attaching state, operation settings are made in the second detection mode including settings of the shutter open time of the line CCD 41 and the ON time of the infrared LED 31 or the driving current of the infrared LED 31 (step S103). Thereafter, an output signal from the line CCD 41 is received (step S104).

The operation settings in step S103 aim at deriving the relative positional relationship between the four sensor units 2 that is an operation state (the second detection mode in FIGS. 9A and 9B) in which light is directly received from the facing sensor unit 2. If the initial operation settings are made in step S103 to obtain a maximum light amount, the state in which no light has been detected in step S105 means that the sensor unit 2 at a facing position does not exist in the field range of the light receiving unit 40 of the sensor unit 2. That is, the arrangement/setting of the sensor bars 1 by the user is improper. In step S106, the user is notified of a message indicative of this, and prompted to set again the sensor bars. Upon completion of re-setting by the user, step S101 starts again. Note that signals detected in steps S105 and S106 are ones as shown in FIG. 9B. In the embodiment, a state in which two signals are output is a normal state.

After that, the waveform of the detection signal is checked (step S107). If light from the sensor unit 2 at a facing position is excessively strong, for example, if at least part of the waveform (waveform level) of the detection signal exceeds a predetermined threshold (NO in step S107), the process returns to step S103, and settings are made again to, for example, shorten the exposure time. A detection signal waveform checked in step S107 next time should exhibit a lower light intensity. If the signal level is appropriate (YES in step S107), for example, if at least part of the detection signal waveform is equal to or lower than the predetermined threshold, the process advances to step S108. This operation is executed in the respective sensor units (four sensor units in the embodiment). After optimizing all the signals, the relative positional relationship between the sensor units 2 is calculated (step S108).

In step S109 and subsequent steps, infrared light projected by the sensor unit 2 is retroreflected by the retroreflecting member 4 mounted on the facing sensor bar 1, the retroreflected light is detected by the light receiving unit 40 of the sensor unit 2 itself, and the signal level at this time is optimized. As described above, the arrangement of the sensor bars 1 is not constant, and a detection level corresponding to the arrangement is optimized to obtain a stable signal. Operation settings are made in the first detection mode including, as items to be set, settings of the shutter open time of the line CCD 41 and the ON time of the infrared LED 31 or the driving current of the infrared LED 31 (step S109). If the initial operation settings are made in step S109 to obtain a maximum light amount, an output signal from the line CCD 41 at this time is received (step S110).

The received output signal is data in the presence of illumination, and has a waveform as shown in FIG. 6B. If light is excessively strong, it exceeds the dynamic range of the line CCD 41, the output is saturated, and it becomes difficult to calculate an accurate angle. In this case, it is determined in step S111 that the detection signal waveform is improper (NO in step S111), the process returns to step S109, and settings are made again to reduce the detection signal waveform (waveform level). Since retroreflected light is detected, it can be set to greatly increase the amount of light to be projected, compared to a case in which the light receiving unit 40 directly detects light projected by the sensor unit 2 in the processes of steps S103 to S108 (that is, the second detection mode).

If it is determined in step S111 that the waveform level is optimum (YES in step S111), a signal Base_Data[N] (see FIG. 6A) in the absence of illumination is acquired and stored in the memory 64 (step S112). Then, a signal Ref_Data[N] (see FIG. 6B) in the presence of illumination is acquired and stored in the memory 64 (step S113).

After acquiring data in all the sensor units, a series of initial setting processes is completed.

FIG. 12A is a flowchart showing a normal sampling operation after initial setting processing.

The initial setting processing in FIG. 11 is executed (step S101). Then, a signal obtained when infrared light projected by the sensor unit 2 is retroreflected by the retroreflecting member 4 mounted on the facing sensor bar 1 and the retroreflected light is detected by the light receiving unit 40 of the sensor unit 2 itself is detected as a normal reception operation (first detection mode) (step S201). The data at this time is Norm_data[N]. If a touch operation is performed and cuts off the optical path, no optical signal can be detected near the pixel number Nc, as shown in FIG. 6C.

Whether any sensor unit 2 has generated such a light shielding portion, that is, the presence/absence of an input is determined (step S202). If it is determined that there is no input (NO in step S202), the process returns again to step S201 to repeat sampling. If it is determined that there is an input (YES in step S202), sensor units which have generated light shielding portions in the output signal are selected (step S203). By using the selected sensor units, the directions (angles) in which the light shielding portions have been generated are calculated (step S204). Based on the calculated angles, the coordinates of the touch position in the digitizer coordinate system are calculated (step S205). The calculated touch position coordinates are transformed into coordinates in the screen coordinate system, and the coordinate value is output (transmitted) to the external device of a personal computer (step S206).

At this time, a touch-down signal/touch-up signal representing whether the input surface remains touched may be output together. In a coordinate input apparatus of this type, the optical path is completely cut off by touching the touch screen. However, when the touch state is gradually canceled, light passes gradually. Thus, by calculating the degree at which light is cut off, whether the touch screen remains touched, or the touch screen is not touched but the optical path is cut off (the angle can be calculated, and even in this case, the position can be calculated) can be determined by setting a threshold.

The switching unit such as a switch is operated to shift to the calibration mode (second detection mode) in which the digitizer coordinate system and screen coordinate system are made to coincide with each other. A sequence in the calibration mode will be explained with reference to FIG. 12B.

The calibration mode is executed immediately after the sensor bars 1 are attached, or when the display position of the display changes accidentally even upon completion of installation. After the transition to the calibration mode, initial setting processing is performed (step S101). In this case, an optical output is optimized and misalignment of the sensors is corrected on the assumption that the setting state of the sensor bars changes during use.

To prompt the user to perform a touch operation at the four corners of the display region 8, it is determined through steps S201 and S202 whether the user has touched one of these positions. In step S203 and S204, necessary angle information is calculated. Thereafter, the user is notified of the completion of data acquisition (step S301). As this notification, for example, a beep sound may be output to represent the completion.

Then, it is determined whether acquisition of information about all the four corners of the display region 8 is completed (step S302). If the acquisition is not completed (NO in step S302), the process returns to step S201. If the acquisition is completed (YES in step S302), parameters for transformation from the digitizer coordinate system into the screen coordinate system are calculated (step S303). The process then returns to the normal operation. The calculated parameters are used in coordinate transformation in step S206.

As described above, according to the embodiment, the light receiving unit of the sensor unit has a predetermined field range. Although the optical axis of the light receiving unit is set in the direction of normal to the pixels of the line CCD, the field range is set to be not symmetric but asymmetric to the optical axis. Then, the optical axis is set to be perpendicular to a straight line connecting at least two sensor units (the centers of the optical axes of the light receiving optical systems) stored in the sensor bar unit. This arrangement can further downsize the housing storing the sensor units.

<<Characteristic Arrangements and Effects of Present Invention>>

As described above, according to the present invention, a coordinate input apparatus which calculates the coordinates of a pointed position to an almost rectangular effective coordinate input region includes first and second housings (sensor bars) each of which incorporates at least two sensor units. Each housing includes a retroreflecting member for returning incident light to the incoming direction. The first and second housings are arranged on two facing sides of the almost rectangular effective coordinate input region.

The sensor unit arranged in each housing includes a light projecting unit which projects infrared light toward the retroreflecting member of the housing arranged on a facing side, and a light receiving unit which receives light retroreflected by the retroreflecting member. A touch in the effective coordinate input region cuts off the optical path, and at least two sensor units can detect directions, corresponding to the touch position, in which light is cut off. The touch position can be calculated by geometrical calculation based on angle information detected by at least two sensor units and distance information between these two sensor units.

The first and second housings include attaching/detaching units (height adjustment units) capable of attachment and detachment to and from a screen surface serving as a coordinate input surface so that the first and second housings can be carried.

Considering the carriage, the first and second housings are desirably configured to be more compact and lighter weight. The light receiving optical system of the sensor unit according to the present invention has a predetermined field range (about 50°). Although the optical axis of the light receiving optical system is set in the normal direction of the pixel of a photoelectric converter, the field range is set to be asymmetric, and the sensor unit includes the optical system asymmetric to the optical axis. The optical axis (or the normal direction of the pixel of the photoelectric converter) is set to be perpendicular to a straight line connecting at least two sensor units (the centers of the optical axes of the light receiving optical systems) stored in the housing. This arrangement can further downsize the housing storing the sensor units.

Screen surfaces are assumed to have various sizes or aspect ratios, and the effective coordinate input region is set in accordance with the size and shape of the screen surface. For this purpose, each of the first and second housings includes a stretching/contraction unit. By adjusting the stretching/contraction amount, the distance between the sensor units arranged in the housing changes, and the sensor units can be appropriately arranged in accordance with the size of the screen surface.

When attaching the first and second housings including the sensor units, even if their relative positions are not precisely determined, a touch position can be detected at high accuracy. Detection units which detect relative positional information between the sensor units stored in the respective housings upon attaching the housings are arranged, and allow the user to easily attach the housings without being conscious of the relative positions.

If no dedicated driver software need be installed in a personal computer or the like which receives information output from the coordinate input apparatus, the user can use the coordinate input apparatus immediately upon connecting it to an arbitrary personal computer or the like. Work (calibration) to make the coordinate system (digitizer coordinate system) of the coordinate input apparatus and the coordinate system (screen coordinate system) of the display apparatus coincide with each other can be executed without the mediacy of the personal computer.

The main part of the present invention in the coordinate input apparatus is as follows.

A coordinate input apparatus which detects a pointed position to an effective coordinate input region, comprising:

a light projecting unit configured to project light parallelly to the effective coordinate input region;

a reflection unit configured to retroreflect the light projected by the light projecting unit;

a light receiving unit configured to receive light from one of the light projecting unit and the reflection unit;

a first housing configured to incorporate at least two sensor units each including one of the light projecting unit and one of the light receiving unit;

a second housing configured to incorporate at least two sensor units each including one of the light projecting unit and one of the light receiving unit; and a calculation unit configured to calculate the pointed position to the effective coordinate input region based on a variation of a light amount distribution obtained from the light receiving units of each of the first housing and the second housing, wherein in each of the first housing and the second housing, a field range of the light receiving unit is substantially parallel to the effective coordinate input region, an optical axis direction of the light receiving unit is a direction perpendicular to a line segment connecting barycenters of the at least two sensor units in a single housing, and the field range is set to be asymmetric to the optical axis direction.

As described above, according to the present invention, all the building components necessary to detect a touch position are stored in the two housings. The housings are attached to a flat whiteboard, wall surface, or the like, and can detect a touch position. That is, the coordinate input apparatus according to the present invention does not include, as an indispensable building component, a touch input surface serving as the effective coordinate input region. Therefore, even if the effective coordinate input region becomes large (for example, 90-inch class), the operational environment can be implemented everywhere by carrying only the two housings. Further, since the coordinate input apparatus according to the present invention does not include the touch input surface as a building component, the product cost can be greatly reduced, as a matter of course. In other words, the present invention has a significant effect of reducing the introduction cost by using an existing whiteboard or the like held by the user.

Storing all the building components in the two housings gives an effect of easy attachment, wiring, and the like to the whiteboard by the user. Considering carriage, the housings are made more compact and lighter, and the light receiving optical system of the sensor unit is set to be asymmetric to the optical axis. Accordingly, more compact and lighter housings can be implemented, improving portability.

For example, considering attachment to an existing whiteboard, the size of the whiteboard varies depending on the manufacturer, product model number, and the like. If the coordinate input apparatus can be used by utilizing a whiteboard which has already been purchased and used by the user, this leads to reduction of the introduction cost or effective use of the resources.

In the coordinate input apparatus capable of high-accuracy position detection, the housings can be attached at rough accuracy, greatly reducing cumbersome installation and shortening the installation time.

For example, assume that an environment is built, where the coordinate input apparatus formed from the two housings is carried into a meeting room where a whiteboard, personal computer, and front projector have already been introduced, and the screen is directly touched and operated.

At this time, the personal computer already introduced in the meeting room is quickly set usable without installing a driver or the like for operating the coordinate input apparatus, thereby improving installation easiness and portability. That is, a dedicated personal computer in which the driver or the like has already been installed need not be carried together with the coordinate input apparatus. Since installation work to the personal computer in the meeting room is unnecessary, a meeting can quickly start without any unwanted setup time.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-082091, filed on Mar. 30, 2012, which is hereby incorporated by reference herein in its entirety.

What is claimed is:

1. A coordinate input apparatus which detects a pointed position to an effective coordinate input region, comprising:
a light projecting unit configured to project light parallelly to the effective coordinate input region;
a reflection unit configured to retroreflect the light projected by said light projecting unit;
a light receiving unit configured to receive light from one of said light projecting unit and said reflection unit;

a first housing configured to incorporate at least two sensor units each including one of the light projecting unit and one of the light receiving unit;

a second housing configured to incorporate at least two sensor units each including one of the light projecting unit and one of the light receiving unit; and a calculation unit configured to calculate the pointed position to the effective coordinate input region based on a variation of a light amount distribution obtained from said light receiving units of each of said first housing and said second housing, wherein in each of said first housing and said second housing, a field range of said light receiving unit is substantially parallel to the effective coordinate input region, an optical axis direction of said light receiving unit is a direction perpendicular to a line segment connecting barycenters of the at least two sensor units in a single housing, and the field range is set to be asymmetric to the optical axis direction.

2. The apparatus according to claim 1, wherein in each of said first housing and said second housing, the optical axis direction of said light receiving unit coincides with a direction of normal to a light receiving surface of a photoelectric converter which forms a light receiving optical system forming said light receiving unit.

3. The apparatus according to claim 2, wherein a mounting surface of a circuit board on which the photoelectric converter is mounted is substantially perpendicular to the effective coordinate input region.

4. The apparatus according to claim 1, wherein each of said first housing and said second housing includes a stretching/contraction unit configured to be stretched/contracted in a direction of the line segment connecting the barycenters of the at least two sensor units incorporated in each of said first housing and said second housing.

5. The apparatus according to claim 1, wherein each of said first housing and said second includes said reflection unit to retroreflect light from said light projecting unit of the sensor unit of the other housing.

6. The apparatus according to claim 1, wherein said first housing and said second housing are arranged on two facing sides of a rectangular region forming the effective coordinate input region.

7. The apparatus according to claim 1, further comprising a detection unit configured to detect relative positional information between the sensor units incorporated in each of said first housing and said second housing.

8. The apparatus according to claim 1, further comprising a calibration unit configured to execute calibration to correlate a first coordinate system in the effective coordinate input region of the coordinate input apparatus and a second coordinate system in a display region serving as a projected image from a display apparatus that is set in the effective coordinate input region.

* * * * *